(12) United States Patent
Roberge

(10) Patent No.: US 11,401,814 B2
(45) Date of Patent: Aug. 2, 2022

(54) ROTOR ASSEMBLY WITH INTERNAL VANES

(71) Applicant: United Technologies Corporation, Farmington, CT (US)

(72) Inventor: Gary D. Roberge, Tolland, CT (US)

(73) Assignee: Raytheon Technologies Corporation

( * ) Notice: Subject to any disclaimer, the term of this patent is extended or adjusted under 35 U.S.C. 154(b) by 158 days.

(21) Appl. No.: 16/796,248

(22) Filed: Feb. 20, 2020

(65) Prior Publication Data

US 2021/0222562 A1     Jul. 22, 2021

Related U.S. Application Data

(60) Provisional application No. 62/962,628, filed on Jan. 17, 2020, provisional application No. 62/962,640, (Continued)

(51) Int. Cl.
*F01D 5/08*     (2006.01)
*F01D 5/18*     (2006.01)
(Continued)

(52) U.S. Cl.
CPC .............. *F01D 5/085* (2013.01); *F01D 5/18* (2013.01); *F01D 5/284* (2013.01); *F01D 5/3007* (2013.01);
(Continued)

(58) Field of Classification Search
CPC . F01D 5/085; F01D 5/18; F01D 5/284; F05D 2260/20; F05D 2260/30
See application file for complete search history.

(56) References Cited

U.S. PATENT DOCUMENTS 1,362,074 A     12/1920   Baumann
2,369,795 A  *   2/1945   Andre .................. F01D 25/125
                                                      415/180

(Continued)

FOREIGN PATENT DOCUMENTS

EP     1657405 B1    9/2011
GB      848465 A     9/1960

OTHER PUBLICATIONS

Freche et al., NACA Research Memorandum, "Investigation of a Gas Turbine with National Bureau of Standards Body 4811 Ceramic Rotor Blades", Oct. 28, 1948, https://ntrs.nasa.gov/archive/nasa/casi.ntrs.nasa.gov/19930085441.pdf.

(Continued)

*Primary Examiner* — Courtney D Heinle
*Assistant Examiner* — Ryan C Clark
(74) *Attorney, Agent, or Firm* — Getz Balich LLC

(57) ABSTRACT

A rotor assembly is provided for a gas turbine engine. This rotor assembly includes a first rotor disk, a second rotor disk, a plurality of rotor blades and a plurality of vanes. The first rotor disk is configured to rotate about a rotational axis. The second rotor disk is configured to rotate about the rotational axis. The rotor blades are arranged circumferentially around the rotational axis. Each of the rotor blades is axially between and mounted to the first rotor disk and the second rotor disk. The vanes are arranged circumferentially around the rotational axis. The vanes include a first vane that is integral with the first rotor disk and projects axially to the second rotor disk.

17 Claims, 32 Drawing Sheets

Related U.S. Application Data filed on Jan. 17, 2020, provisional application No. 62/962,635, filed on Jan. 17, 2020, provisional application No. 62/962,636, filed on Jan. 17, 2020, provisional application No. 62/962,620, filed on Jan. 17, 2020.

(51) Int. Cl.
 *F01D 5/28* (2006.01)
 *F01D 5/30* (2006.01)

(52) U.S. Cl.
 CPC ...... *F05D 2260/20* (2013.01); *F05D 2260/30* (2013.01)

(56) References Cited

U.S. PATENT DOCUMENTS

| | | | | |
|---|---|---|---|---|
| 2,401,826 | A * | 6/1946 | Frank | F01D 5/087 416/97 R |
| 2,641,440 | A | 6/1953 | Williams | |
| 2,657,008 | A | 10/1953 | Atkinson | |
| 2,819,869 | A | 1/1958 | Meyer, Jr. | |
| 2,918,252 | A | 12/1959 | Haworth | |
| 2,988,325 | A | 6/1961 | Grahame | |
| 2,994,507 | A | 8/1961 | Keller | |
| 3,055,633 | A | 9/1962 | Pouit | |
| 3,281,116 | A | 10/1966 | Keenan | |
| 3,742,706 | A | 7/1973 | Klompas | |
| 3,832,090 | A | 8/1974 | Matto | |
| 3,943,703 | A | 3/1976 | Kronogard | |
| 3,982,852 | A | 9/1976 | Andersen | |
| 4,097,194 | A | 6/1978 | Barack | |
| 4,098,559 | A | 7/1978 | Price | |
| 4,102,603 | A * | 7/1978 | Smith | F01D 5/087 416/244 A |
| 4,171,930 | A | 10/1979 | Brisken | |
| 4,415,310 | A * | 11/1983 | Bouiller | F01D 5/3069 416/95 |
| 4,595,339 | A * | 6/1986 | Naudet | F01D 5/048 415/115 |
| 4,595,340 | A | 6/1986 | Klassen | |
| 4,802,824 | A | 2/1989 | Gastebois | |
| 4,877,376 | A | 10/1989 | Sikorski | |
| 5,135,354 | A | 8/1992 | Novotny | |
| 5,169,289 | A | 12/1992 | Lalanne | |
| 5,197,857 | A | 3/1993 | Glynn | |
| 5,435,694 | A | 7/1995 | Kray | |
| 5,961,287 | A * | 10/1999 | Cairo | F01D 5/085 416/97 R |
| 6,213,720 | B1 | 4/2001 | Farmer | |
| 6,267,553 | B1 | 7/2001 | Burge | |
| 6,361,277 | B1 * | 3/2002 | Bulman | F04D 29/582 416/96 R |
| 7,159,402 | B2 | 1/2007 | Hein | |
| 8,231,354 | B2 | 7/2012 | Campbell | |
| 8,430,623 | B2 | 4/2013 | Beckford | |
| 8,435,008 | B2 | 5/2013 | Hagan | |
| 8,636,470 | B2 | 1/2014 | Halfmann | |
| 9,598,967 | B2 | 3/2017 | Xu | |
| 9,708,917 | B2 | 7/2017 | Belmonte | |
| 9,920,638 | B2 | 3/2018 | Le Hong | |
| 10,024,173 | B2 | 7/2018 | Mccaffrey | |
| 10,180,071 | B2 | 1/2019 | Freeman | |
| 10,221,170 | B2 | 3/2019 | Kamenecka | |
| 10,570,914 | B2 | 2/2020 | Lueddecke | |
| 2005/0084379 | A1 | 4/2005 | Schreiber | |
| 2016/0186569 | A1 | 6/2016 | Choi | |
| 2016/0195019 | A1 | 7/2016 | Roberge | |
| 2016/0215627 | A1 | 7/2016 | Roberge | |
| 2016/0362985 | A1 | 12/2016 | Lacy | |
| 2017/0122114 | A1 | 5/2017 | Kittleson | |
| 2017/0320178 | A1 | 11/2017 | Roberge | |
| 2017/0321606 | A1 * | 11/2017 | Soltysiuk | F02C 6/08 |
| 2018/0119549 | A1 | 5/2018 | Vetters | |
| 2018/0156047 | A1 | 6/2018 | Nucci | |
| 2018/0209280 | A1 | 7/2018 | Forsdike | |
| 2019/0048889 | A1 | 2/2019 | Roberge | |
| 2019/0203602 | A1 | 7/2019 | Mcmahon | |
| 2019/0301292 | A1 | 10/2019 | Harris | |
| 2019/0338657 | A1 | 11/2019 | Freeman | |
| 2020/0300174 | A1 | 9/2020 | Williamson | |

OTHER PUBLICATIONS

EP search report for EP21152157.0 dated Jun. 28, 2021.

\* cited by examiner

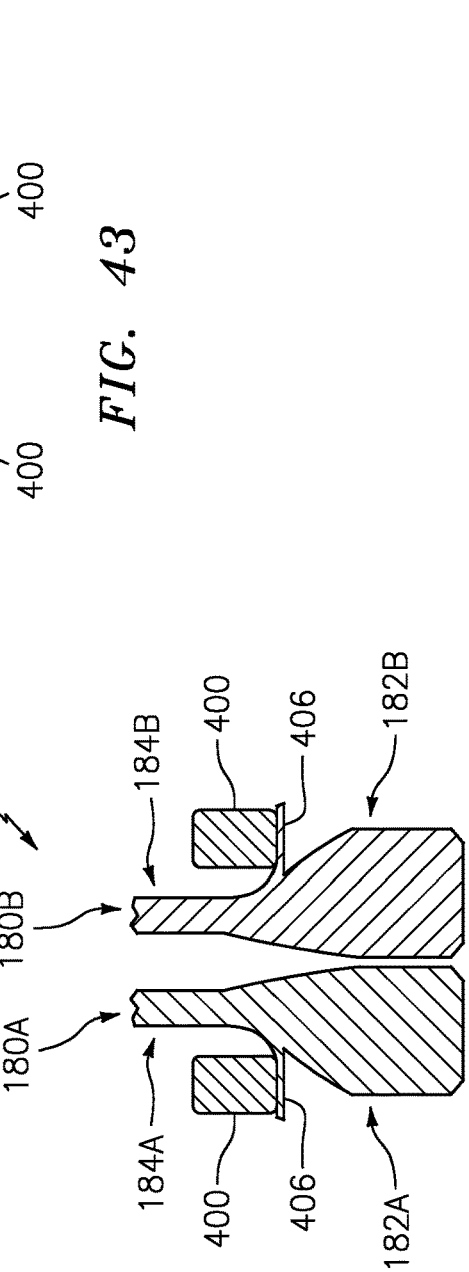
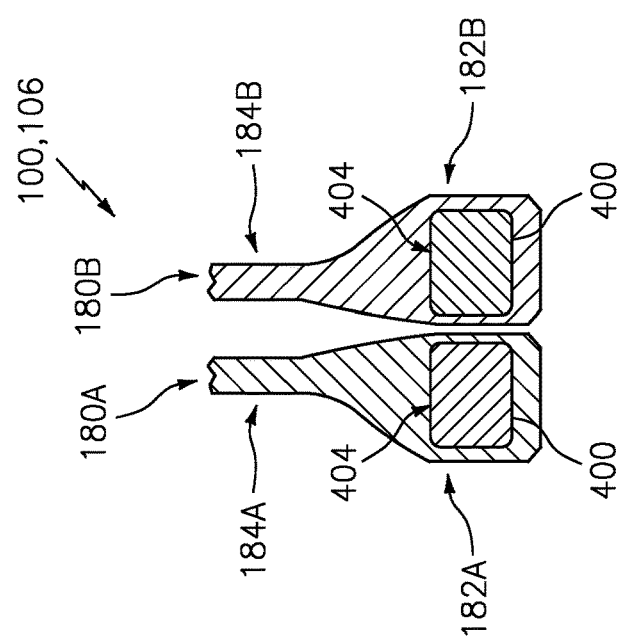
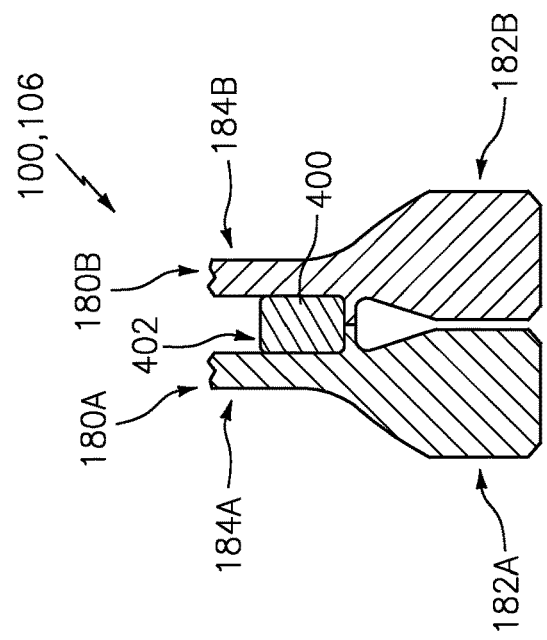
FIG. 41
FIG. 42
FIG. 43

ROTOR ASSEMBLY WITH INTERNAL VANES

This application claims priority to U.S. Patent Appln. No. 62/962,640 filed Jan. 17, 2020, U.S. Patent Appln. No. 62/962,620 filed Jan. 17, 2020, U.S. Patent Appln. No. 62/962,628 filed Jan. 17, 2020, U.S. Patent Appln. No. 62/962,635 filed Jan. 17, 2020 and U.S. Patent Appln. No. 62/962,636 filed Jan. 17, 2020, all of which are hereby incorporated by reference herein in their entireties.

BACKGROUND OF THE DISCLOSURE

1. Technical Field

This disclosure relates generally to rotational equipment and, more particularly, to rotor blades and associated rotor assemblies.

2. Background Information

Gas turbine engine designers are continually being challenged to provide gas turbine engines with improved performance at reduced weights. One design metric being pushed to provide improved performance is increasing turbine rotational speed. As the turbine rotational speed is increased, however, rotor disk bores also increase in size in order to accommodate increasing centrifugal loading. This can result in bore widths that are so large that heat treating the center of a bore may become challenging. Rotor disk sizing may also be impacted by rim pull which includes the mass of airfoils and interrupted (circumferentially discontinuous) features created by axially or angled airfoil attachment features.

Current turbine design standard includes separate airfoils that are mechanically attached to a disk using single or multiple tooth attachments; e.g., fir tree attachments. Provision of these attachments result in a live rim (full hoop or circumferentially continuous rim) that transfers radial loads from the airfoils as well as segmented portions of the disk between airfoil attachments. In addition, cover plates are typically employed to reduce leakage through attachments from one side of the disk to the other.

There is a need in the art for improved rotor blades and rotor assemblies with reduced weights and/or with improved cooling schemes. This includes rotor blades made using high temperature composites such as ceramic matrix composite (CMC) materials. It should be recognized that designing for such composite airfoils may require new rotor architectures to accommodate and exploit the unique capabilities and limitations of composite materials.

SUMMARY OF THE DISCLOSURE

According to an aspect of the present disclosure, a rotor assembly is provided for a gas turbine engine. This rotor assembly includes a first rotor disk, a second rotor disk, a plurality of rotor blades and a plurality of vanes. The first rotor disk is configured to rotate about a rotational axis. The second rotor disk is configured to rotate about the rotational axis. The rotor blades are arranged circumferentially around the rotational axis. Each of the rotor blades is axially between and mounted to the first rotor disk and the second rotor disk. The vanes are arranged circumferentially around the rotational axis. The vanes include a first vane that is integral with the first rotor disk and projects axially to the second rotor disk.

According to another aspect of the present disclosure, another rotor assembly is provided for a gas turbine engine. This rotor assembly includes a first rotor disk, a second rotor disk, a plurality of rotor blades and a plurality of vanes. The first rotor disk is configured to rotate about a rotational axis. The second rotor disk is configured to rotate about the rotational axis. The rotor blades are arranged circumferentially around the rotational axis. Each of the rotor blades is axially between and mounted to the first rotor disk and the second rotor disk. The vanes are arranged circumferentially around the rotational axis. The vanes include a first vane that is integral with the first rotor disk and axially engages the second rotor disk.

According to still another aspect of the present disclosure, another rotor assembly is provided for a gas turbine engine. This rotor assembly includes a first rotor disk, a second rotor disk, a plurality of rotor blades and a plurality of vanes. The first rotor disk is configured to rotate about a rotational axis. The second rotor disk is configured to rotate about the rotational axis. The rotor blades are arranged circumferentially around the rotational axis. Each of the rotor blades is mounted to the first rotor disk. The vanes are arranged circumferentially around the rotational axis and axially between the first rotor disk and the second rotor disk. The vanes include a first vane connected to the first rotor disk or the second rotor disk. The first vane extends longitudinally along a centerline from a radial inner end of the first vane to a radial outer end of the first vane. At least a portion of the centerline is curved.

At least the first vane and the first rotor disk or the second rotor disk may be formed together in a monolithic body.

The first vane may extend longitudinally along a centerline from a radial inner end of the first vane to a radial outer end of the first vane. At least a portion or an entirety of the centerline may be straight.

The first vane may extend longitudinally along a centerline from a radial inner end of the first vane to a radial outer end of the first vane. At least a portion or an entirety of the centerline may be curved.

The first vane may extend longitudinally along a centerline from a radial inner end of the first vane to a radial outer end of the first vane. At least a portion or an entirety of the centerline may be perpendicular to the rotational axis.

The first vane may extend longitudinally along a centerline from a radial inner end of the first vane to a radial outer end of the first vane. At least a portion or an entirety of the centerline may be angularly offset from the rotational axis.

The vanes may also include a second vane circumferentially neighboring the first vane. The second vane may be integral with the first rotor disk and project axially to the second rotor disk.

The vanes may also include a second vane circumferentially neighboring the first vane. The second vane may be integral with the second rotor disk and project axially to the first rotor disk.

The vanes may be configured to pump fluid in a radial outward direction in a passage, axially between the first rotor disk and the second rotor disk, towards the plurality of rotor blades.

A passage may be defined circumferentially between a circumferentially neighboring pair of the vanes, which passage may be fluidly coupled with a passage within a first of the plurality of rotor blades.

The first rotor disk may include a hub, a web and a rim. The web may extend radially out from the hub to the rim. The first vane may project axially out from and may be integral with the web.

The rotor assembly may include a plurality of disk mounts connecting the first rotor disk and the second rotor disk together.

A first of the disk mounts may be disposed circumferentially between a circumferentially neighboring pair of the plurality of vanes.

The rotor blades may include a first rotor blade with a dovetail attachment.

The dovetail attachment may project axially along the rotational axis into a first pocket in the first rotor disk.

The dovetail attachment may project axially along the rotational axis into a second pocket in the second rotor disk.

A portion of the first rotor disk may extend circumferentially across and thereby circumferentially cover the dovetail attachment.

The rotor blades may include a first rotor blade, and the first rotor blade may be configured from or otherwise include ceramic.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 41-43 are partial side sectional illustrations of embodiments of the rotor assembly of FIG. 1 configured with one or more reinforcing rings.

DETAILED DESCRIPTION

Figure 1:
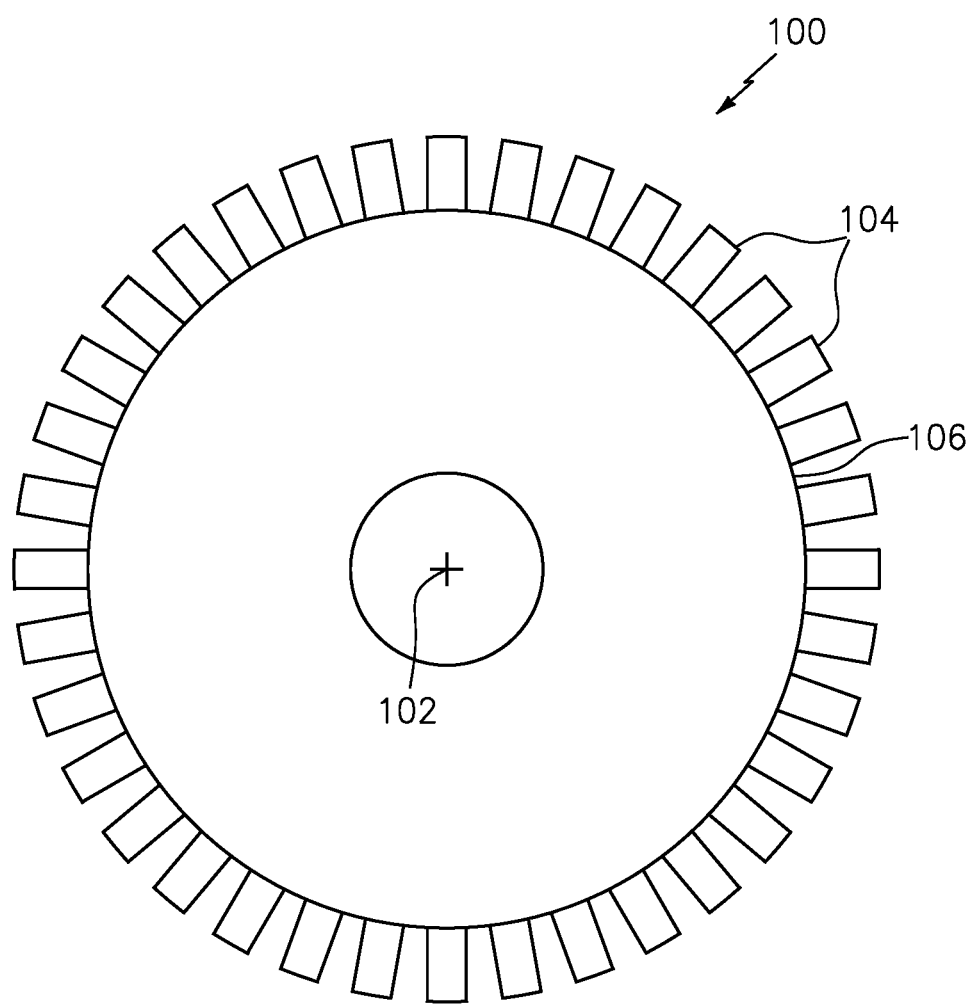
FIG. 1 is a schematic illustration of a bladed rotor assembly.

FIG. 1 illustrates a bladed rotor assembly 100 for rotational equipment with an axial centerline 102, which centerline 102 may be or may be coaxial with an axis of rotation (e.g., a rotational axis) of the rotor assembly 100. An example of such rotational equipment is a gas turbine engine for an aircraft propulsion system, an exemplary embodiment of which is described below in further detail with respect to FIG. 36. However, the rotor assembly 100 of the present disclosure is not limited to such an aircraft application nor a gas turbine engine application. The rotor assembly 100, for example, may alternatively be configured with rotational equipment such as an industrial gas turbine engine, a wind turbine, a water turbine or any other apparatus which includes a bladed rotor.

Figure 2:
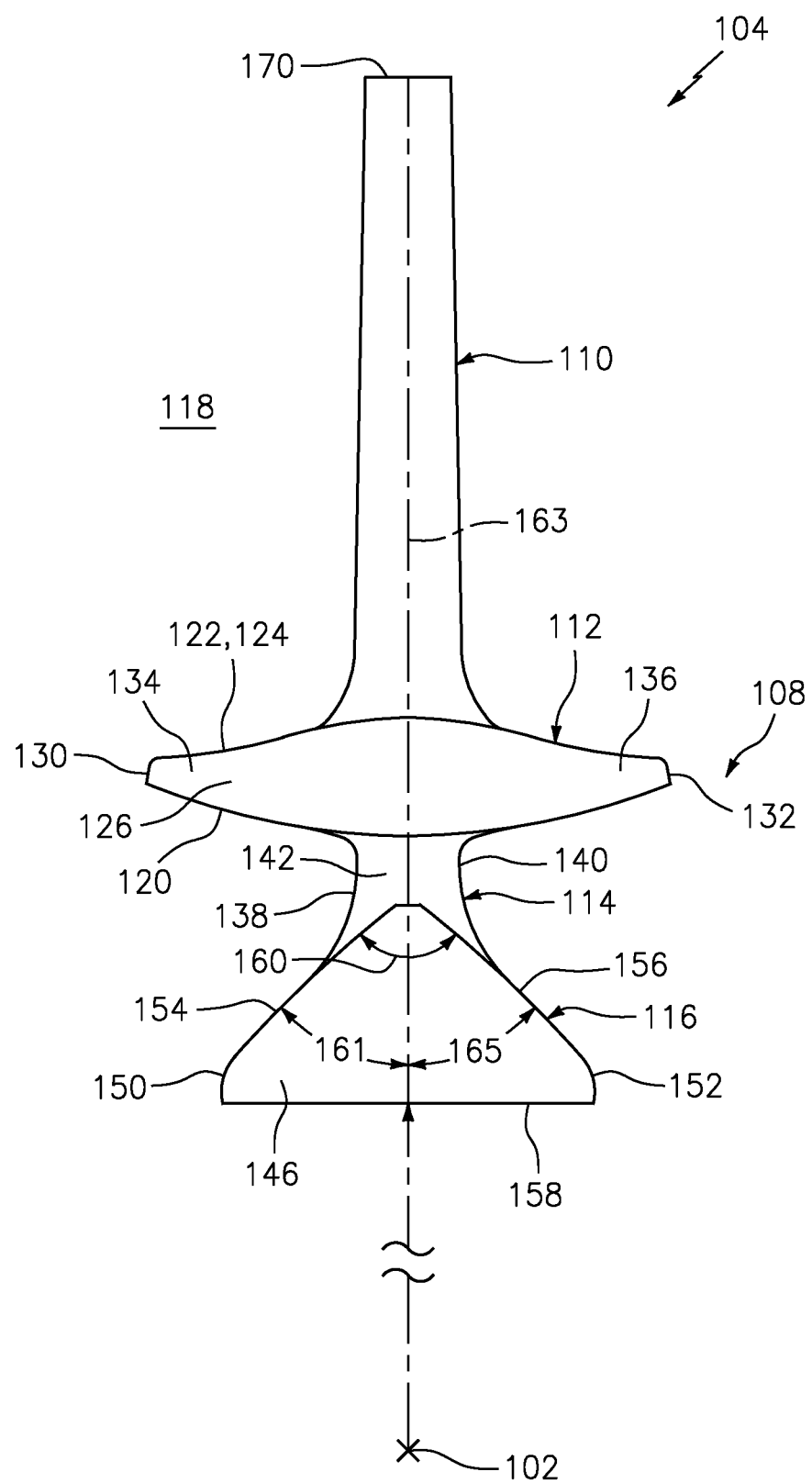
FIG. 2 is an illustration of a first axial end of a rotor blade.
Figure 3:
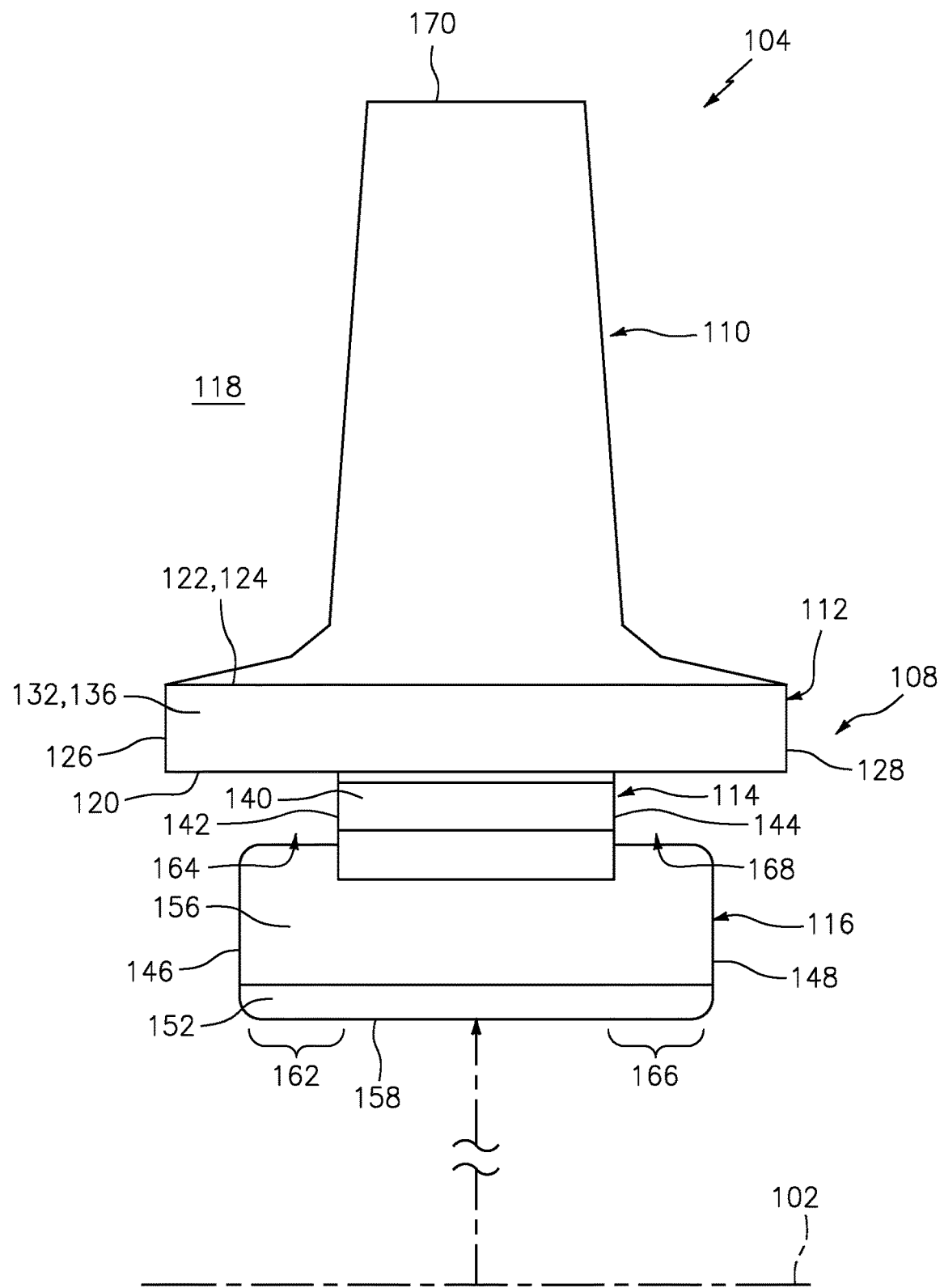
FIG. 3 is an illustration of a side of the rotor blade of FIG. 2.

The rotor assembly 100 of FIG. 1 includes a plurality of rotor blades 104 and a rotor disk assembly 106. Referring to FIGS. 2 and 3, each of the rotor blades 104 may be configured as a rotor blade singlet; e.g., a rotor blade that only includes a single airfoil. The present disclosure, however, is not limited to such an exemplary rotor blade configuration. In other embodiments, for example, one or more or each of the rotor blades 104 may alternatively be configured as a rotor blade doublet with a pair of airfoils.

Referring still to FIGS. 2 and 3, each rotor blade 104 includes a rotor blade mount 108 and a rotor blade airfoil 110. The rotor blade mount 108 of FIGS. 2 and 3 includes a mount platform 112, a mount neck 114 and a mount attachment 116.

The mount platform 112 is configured to form a portion of an inner peripheral boarder of a gas path 118 (e.g., a core gas path) that extends axially along the axial centerline 102 across the rotor assembly 100; e.g., a gas path into which the airfoils 110 radially extend. The mount platform 112, for example, extends radially relative to the axial centerline 102 between a platform inner end 120 and a platform outer end 122. The platform outer end 122 carriers a gas path surface 124, which forms the respective inner peripheral boarder portion of the gas path 118. As best seen in FIG. 3, the gas path surface 124 extends axially between a platform first (e.g., forward and/or upstream) side 126 and a platform second (e.g., aft and/or downstream) side 128. As best seen in FIG. 2, the gas path surface 124 extends laterally (e.g., circumferentially or tangentially) between opposing platform lateral sides 130 and 132.

The mount platform 112 is configured with one or more lateral platform overhangs 134 and 136; e.g., wings, flanges, projections, etc. One or both of these platform overhangs 134 and 136 may have a tapered geometry. A radial thickness of the mount platform 112 of FIG. 2, for example, decreases (e.g., tapers) as the mount platform 112 and its first platform overhang 134 extend laterally from a laterally intermediate location towards or to the first lateral side 130. This change in thickness provides the first platform overhang 134 with its tapered geometry. The radial thickness of the mount platform 112 of FIG. 2 also decreases as the mount platform 112 and its second platform overhang 136 extend laterally from the laterally intermediate location towards or to the second lateral side 132. This change in thickness provides the second platform overhang 136 with its tapered geometry.

The mount neck 114 is located radially beneath the mount platform 112. The mount neck 114 extends radially between and is connected (e.g., directly) to the mount platform 112 and the mount attachment 116.

The mount neck 114 extends laterally between opposing neck lateral sides 138 and 140. The neck first lateral side 138 is laterally recessed inward from the platform first lateral side 130 such that the first platform overhang 134 projects laterally out from the mount neck 114. The neck second lateral side 140 is laterally recessed inward from the platform second lateral side 132 such that the second platform overhang 136 projects laterally out from the mount neck 114.

Referring to FIG. 3, the mount neck 114 extends axially along the axial centerline 102 between a neck first (e.g., forward and/or upstream) side 142 and a neck second (e.g., aft and/or downstream) side 144. The neck first side 142 is axially recessed inward from the platform first side 126 such that the mount platform 112 and its elements 134 and 136 project axially out from the mount neck 114. The neck second side 144 is axially recessed inward from the platform second side 128 such that the mount platform 112 and its elements 134 and 136 project axially out from the mount neck 114.

Referring to FIGS. 2 and 3, the mount attachment 116 is located radially beneath the mount neck 114. The mount attachment 116 of FIGS. 2 and 3 is configured as a dovetail attachment; e.g., a flared attachment, a delta attachment, etc. As best seen in FIG. 3, the mount attachment 116 extends axially along the axial centerline 102 between an attachment first (e.g., forward and/or upstream) axial side 146 and an attachment second (e.g., aft and/or downstream) axial side 148. As best seen in FIG. 2, the mount attachment 116 extends laterally between opposing attachment lateral sides 150 and 152.

The mount attachment 116 includes one or more attachment pressure surfaces 154 and 156 (e.g., engagement surfaces) and a bottom surface 158. The first attachment pressure surface 154 is arranged to the first lateral side 150 of the mount attachment 116 and the second attachment pressure surface 156 is arranged to the second lateral side 152 of the mount attachment 116. The first and the second attachment pressure surfaces 154 and 156 may meet (e.g., be joined) at an outer peak of the mount attachment 116. The first and the second attachment pressure surfaces 154 and 156 may also respectively meet the neck lateral sides 138 and 140 at interfaces between the mount attachment 116 and the mount neck 114; see also FIG. 3.

Each of the attachment pressure surfaces 154, 156 of FIGS. 2 and 3 is a substantially planar surface. However, in other embodiments, the first attachment pressure surface 154 and/or the second attachment pressure surface 156 may have a non-planar (e.g., curved and/or compound angled) geometry. Referring to FIG. 2, the attachment pressure surfaces 154, 156 are angularly offset from one another by an included angle 160. This angle 160 may be greater than sixty degrees (60°) and less than one hundred and forty degrees (140°). The present disclosure, however, is not limited to such exemplary angles. Furthermore, while an angle 161 between the attachment surface 154 and a span-line 165 of the rotor blade 104 and an angle 165 between the attachment surface 156 and the span-line 165 are shown as equal in FIG. 2 (e.g., the mount attachment 116 may be a symmetric attachment), the angle 161 may alternatively be different (e.g., greater or less) than the angle 165 (e.g., the mount attachment 116 may be an asymmetric attachment) in other embodiments.

The bottom surface 158 of FIG. 2 extends laterally between respective radial inner ends of the attachment pressure surfaces 154 and 156. The first attachment pressure surface 154 extends radially between the bottom surface 158 and the first neck lateral side 138. The second attachment pressure surface 156 extends radially between the bottom surface 158 and the second neck lateral side 140.

Referring to FIG. 3, an axial first end portion 162 (e.g., a cantilevered projection) of the mount attachment 116 projects axially out from the neck first side 142. The rotor blade mount 108 is thereby configured with a first gap 164 (e.g., a recess, a notch, etc.) axially adjacent the mount neck 114, which first gap 164 extends radially between the axial first end portion 162 of the mount attachment 116 and the mount platform 112. Similarly, an axial second end portion 166 (e.g., a cantilevered projection) of the mount attachment 116 projects axially out from the neck second side 144. The rotor blade mount 108 is thereby configured with a second gap 168 (e.g., a recess, a notch, etc.) axially adjacent the mount neck 114, which second gap 168 extends radially between the axial second end portion 166 of the mount attachment 116 and the mount platform 112.

Referring to FIGS. 2 and 3, the rotor blade airfoil 110 is connected (e.g., directly) to the mount platform 112. The rotor blade airfoil 110 projects radially relative to the axial centerline 102 out from the gas path surface 124, in a spanwise direction, to a (e.g., unshrouded) tip 170 of the rotor blade airfoil 110.

Figure 4:
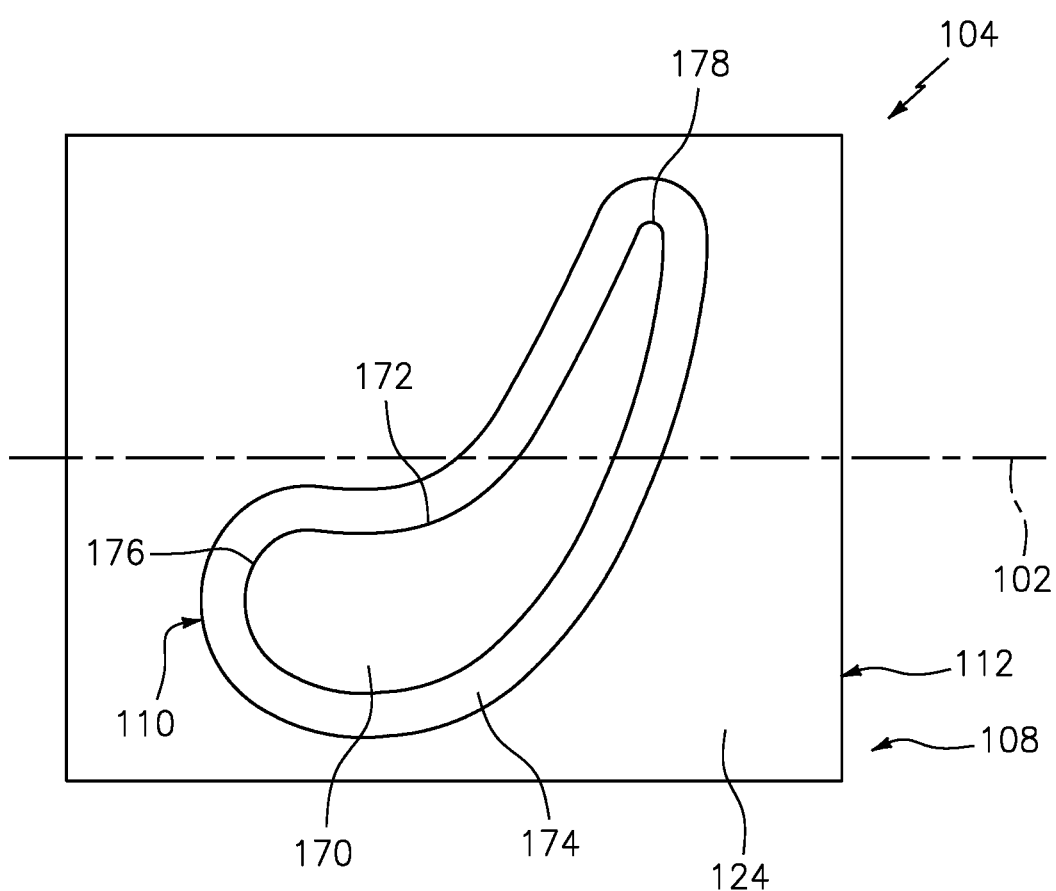
FIG. 4 is an illustration of an outer, top end of the rotor blade of FIG. 2.

Referring to FIG. 4, the rotor blade airfoil 110 includes a first (e.g., pressure and/or concave) side surface 172, a second (e.g., suction and/or convex) side surface 174, a (e.g., forward and/or upstream) leading edge 176 and a (e.g., aft and/or downstream) trailing edge 178. The first and second side surfaces 172 and 174 extends along a chord line of the rotor blade airfoil 110 between and meet at the leading edge 176 and the trailing edge 178.

The rotor blade 104 and its various components 108 and 110 of FIGS. 2-4 may be configured together as a monolithic body. The term "monolithic" may describe a single unitary body formed without severable components; e.g., a body formed with integral components. For example, the rotor blade 104 may be laid up, cast, machined and/or otherwise formed from a single body of material. In another example, the rotor blade 104 may be formed from a plurality of discretely formed segments which are subsequently permanently bonded together; e.g., welded, adhered, etc. Examples of permanent bonding techniques include, but are not limited to, transient liquid phase (TLP) bonding of one or more components to form a single unitized structure blade pair. These components may be single crystal or poly-crystalline or directionally controlled crystalline structures that are individually oriented in an optimized manner to provide locally desired structural capability. By contrast, the term "non-monolithic" may described a body formed from a plurality of discretely formed bodies that are severable; e.g., may be disassembly from one another. For example, a non-monolithic body may be formed from a plurality of discretely formed segments which are subsequently mechanically attached and/or brazed together. The present disclosure, however, is not limited to monolithic rotor blades 104.

The rotor blade 104 and its various components 108 and 110 may be formed from various metallic or non-metallic materials. Examples of the rotor blade materials include, but are not limited to, metal, intermetallic material and/or ceramic. Examples of the metal include, but are not limited to, nickel (Ni), titanium (Ti), aluminum (Al), chromium (Cr) or an alloy of one or more of the foregoing metals; e.g., a single crystal alloy or super alloy. Examples of the intermetallic material include, but are not limited to, TiAl and NiAl. The ceramic may be a monolithic ceramic or a ceramic matrix composite (CMC) material. An example of the monolithic ceramic is, but is not limited to, $Si_3N_4$. Examples of the ceramic matrix composite material include, but are not limited to, SiC/SiC and C/SiC. In the case of the ceramic matrix composite material, a fiber reinforcement (e.g., long fibers or woven fibers) within a matrix of the CMC material may be laid to follow at least partially or completely along a longitudinal length of the rotor blade 104. With such an arrangement, the fiber reinforcement may substantially remain in tension during operation of the rotor assembly 100. The present disclosure, however, is not limited to such an exemplary fiber reinforcement orientation, nor to the foregoing exemplary materials. In the embodiment shown in FIGS. 2 and 3, the rotor blade 104 is configured as a solid rotor blade. However, in other embodiments, one or more elements including the airfoil 110 and/or one or more elements of the mount 108 (e.g., 112, 114 and/or 116) may be hollow in order to reduce the mass of the rotor blade 104. The rotor blade 104 may also or alternatively be hollow to provide one or more flow passages for cooling the airfoil 110 and/or the gas path surface 124 of the mount platform 112 as described below in further detail.

Figure 5:
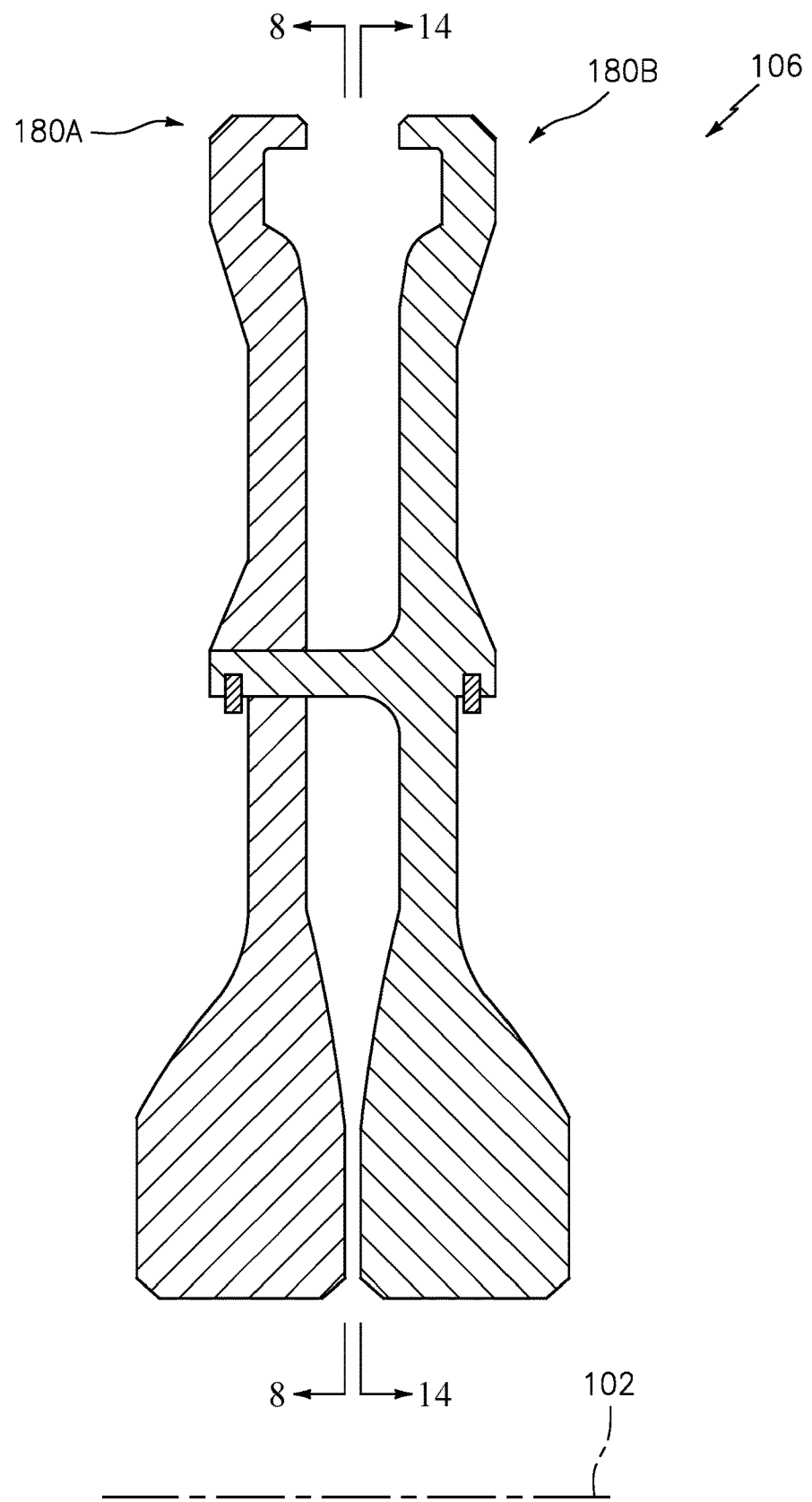
FIG. 5 is a partial, side sectional illustration of a rotor disk assembly.

Referring to FIG. 5, the rotor disk assembly 106 includes a plurality of rotor disks such as a first (e.g., upstream/forward) rotor disk 180A and a second (e.g., downstream/aft) rotor disk 180B. Each rotor disk 180A, 180B (generally referred to as "180") extends circumferentially about (e.g., complete around) the axial centerline 102 to provide that rotor disk 180 with a full hoop, annular body. This annular body may be a monolithic body. Alternatively, the annular body may be formed from a plurality of interconnected arcuate circumferential segments; e.g., disk halves, disk thirds, disk quarters, etc.

Figure 6:
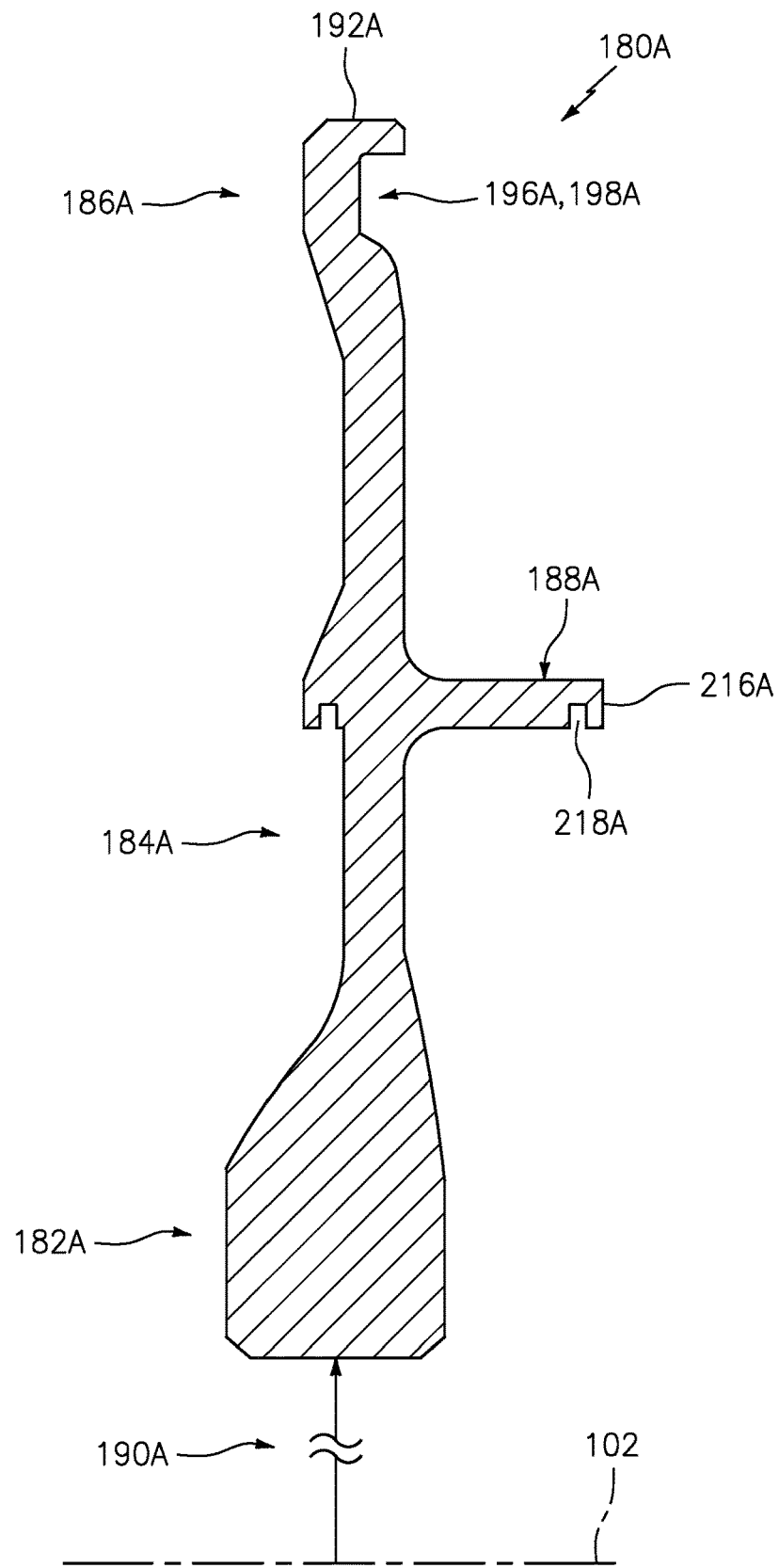
FIG. 6 is a partial, side sectional illustration of a first rotor disk of the rotor disk assembly of FIG. 5 at a first circumferential location.
Figure 7:
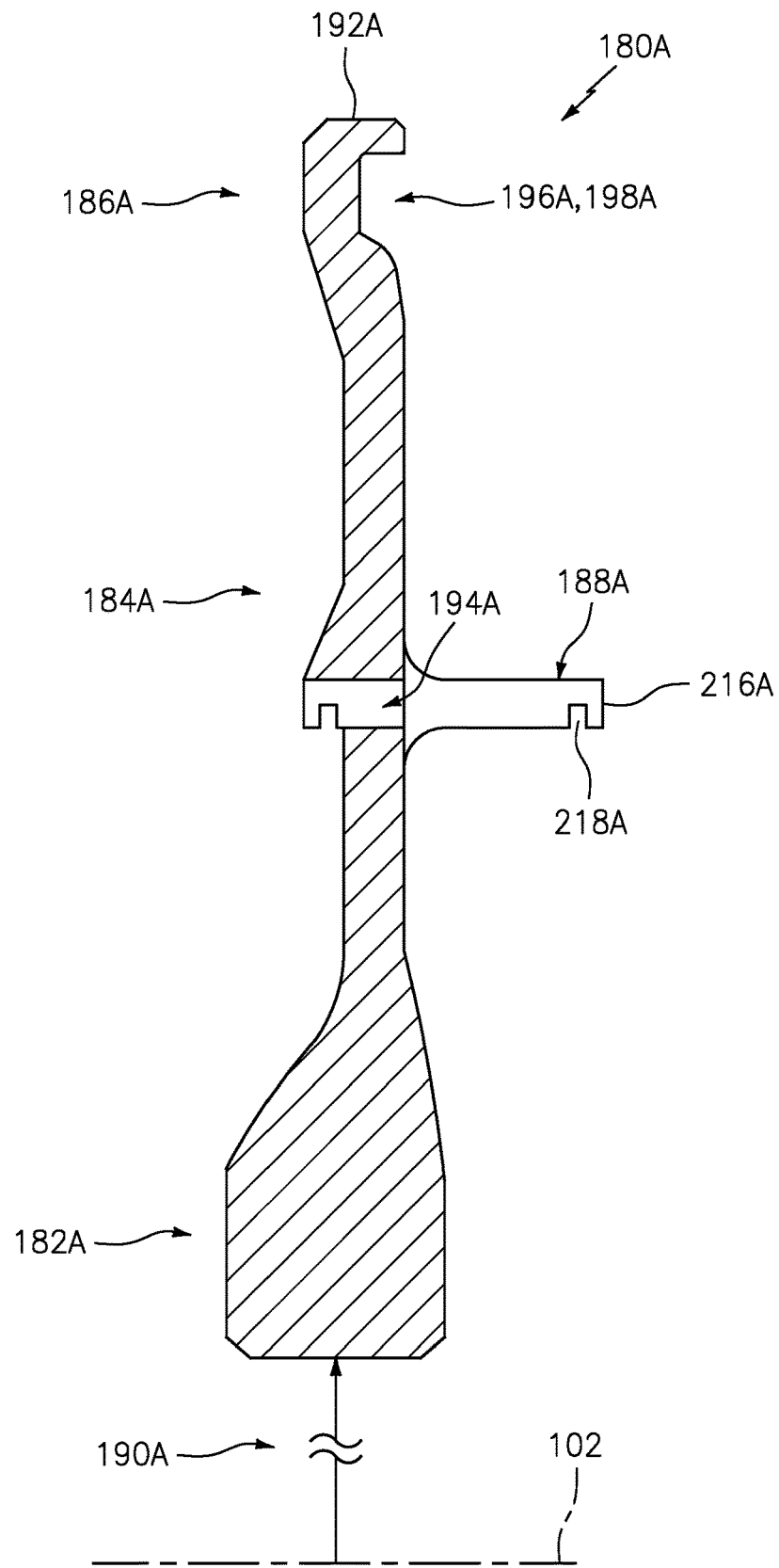
FIG. 7 is a partial, side sectional illustration of the first rotor disk of FIG. 5 at a second circumferential location.

The first rotor disk 180A of FIGS. 6 and 7 includes an inner first hub 182A, a first web 184A and an outer first rim 186A. The first rotor disk 180A of FIG. 6 also includes one or more first disk mounts 188A; see also FIG. 8.

The first hub 182A is an annular segment of the first rotor disk 180A and defines an inner bore 190A through the first rotor disk 180A. The first hub 182A may be configured as a rotating mass for the first rotor disk 180A. The first web 184A is connected to and extends radially between the first hub 182A and the first rim 186A. The first rim 186A is arranged at an outer distal end 192A of the first rotor disk 180A.

In general, the first rim 186A has an (e.g., maximum) axial width that is greater than an (e.g., maximum) axial width of the first web 184A. The axial width of the first rim 186A is less than an (e.g., maximum) axial width of the first hub 182A, where the axial width of the first hub 182A is also greater than the axial width of the first web 184A. The present disclosure, however, is not limited to the foregoing exemplary relationships. For example, in other embodiments, the axial width of the first rim 186A may be equal to the axial width of first hub 182A.

Referring to FIG. 7, the first web 184A is configured with one or more first disk mount apertures 194A (e.g., throughholes). These first disk mount apertures 194A may be radially intermediately located between the first hub 182A and the first rim 186A. Note, the first disk mount 188A in FIG. 7 is shown out of plane for reference in order to illustrate the relative positioning of aperture first disk mount apertures 194A.

Figure 8:
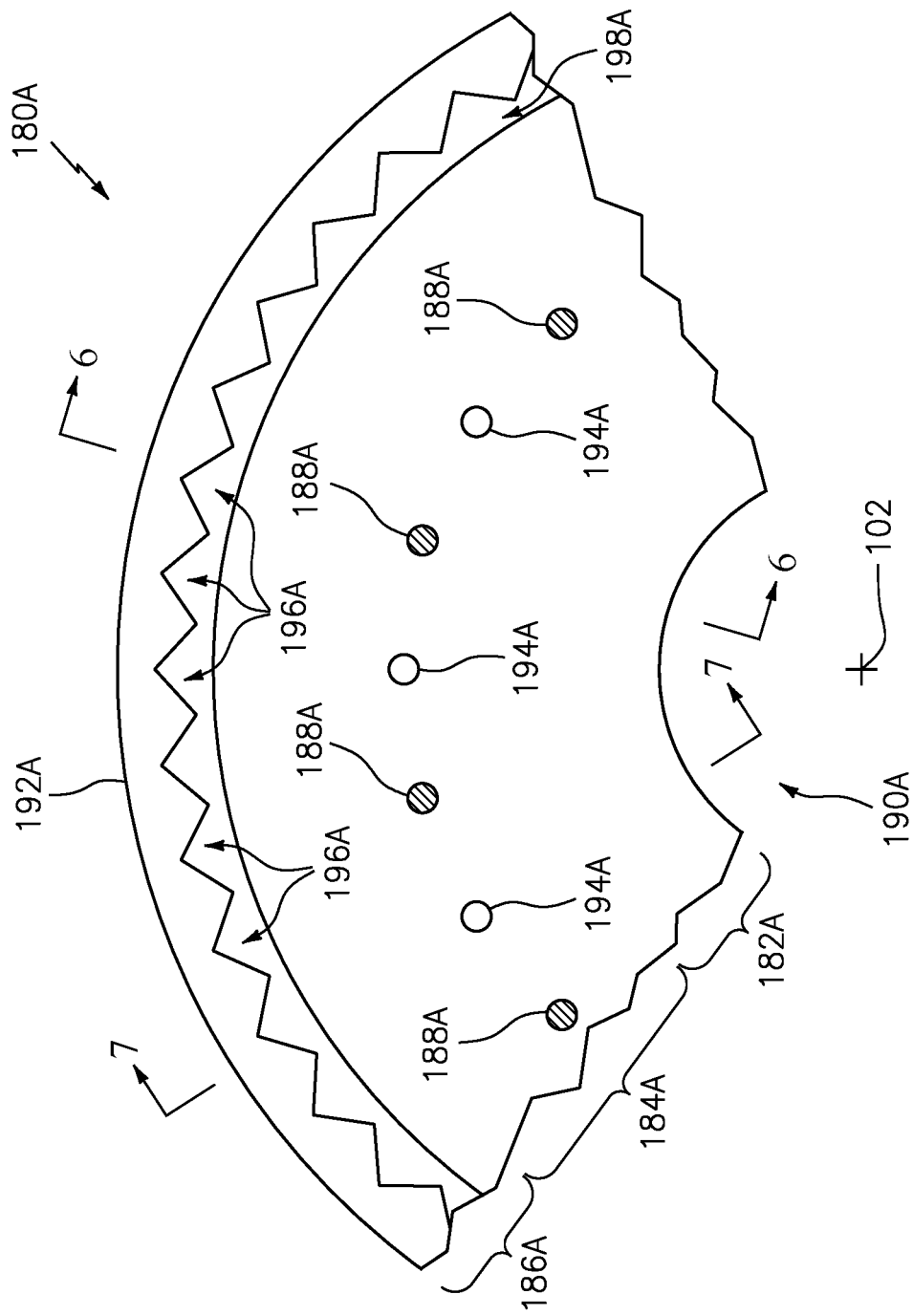
FIG. 8 is a partial, cross-sectional illustration of the first rotor disk of FIG. 5 taken along line 8-8 in FIG. 5.

Referring to FIG. 8, the first disk mount apertures 194A are arranged circumferentially around the axial centerline 102 in an annular array and are interposed with the first disk mounts 188A. For example, a respective one of the first disk mounts 188A may be positioned circumferentially between each circumferentially adjacent/neighboring pair of the first disk mount apertures 194A. Similarly, a respective one of the first disk mount apertures 194A may be positioned circumferentially between each circumferentially adjacent/neighboring pair of the first disk mounts 188A. Each of these first disk mount apertures 194A of FIG. 8 has a circular cross-sectional geometry. However, in other embodiments, one or more or each of the first disk mount apertures 194A may have a non-circular geometry (e.g., an elliptical cross-sectional geometry, a polygonal (e.g., rectilinear) cross-sectional geometry, etc.) or any other geometry selected to accommodate a respective one of the disk mounts 188B as described below.

Figure 9:
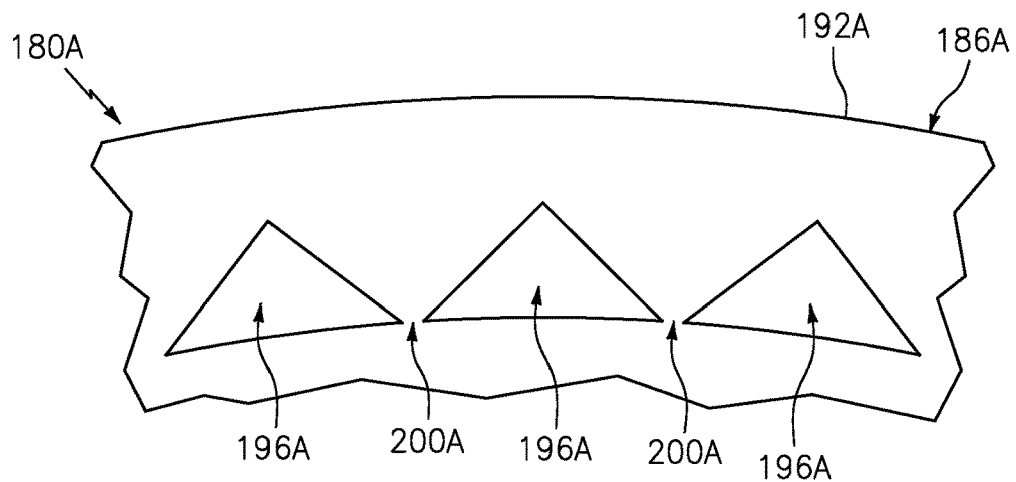
FIG. 9 is a partial illustration of an axial end of a rim of another first rotor disk.

Referring to FIGS. 6-8, the first rim 186A is configured with one or more first disk pockets 196A located at (e.g., on, adjacent or proximate) an outer end of the first rim 186A. These first disk pockets 196A are arranged circumferentially around the axial centerline 102 in an annular array. The first disk pockets 196A of FIG. 8 are circumferentially interconnected so as to form an (e.g., serrated) annular groove 198A in the first rim 186A. However, in other embodiments, the first disk pockets 196A may be discrete from one another and separated by divider portions 200A of the first rim 186A as shown, for example, in FIG. 9.

Figure 10:
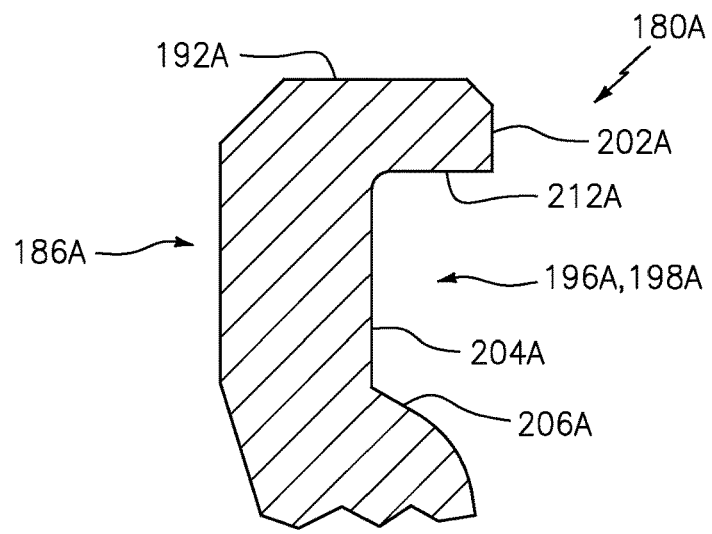
FIG. 10 is a partial, side sectional illustration of a rim of the first rotor disk of FIG. 5.
Figure 11:
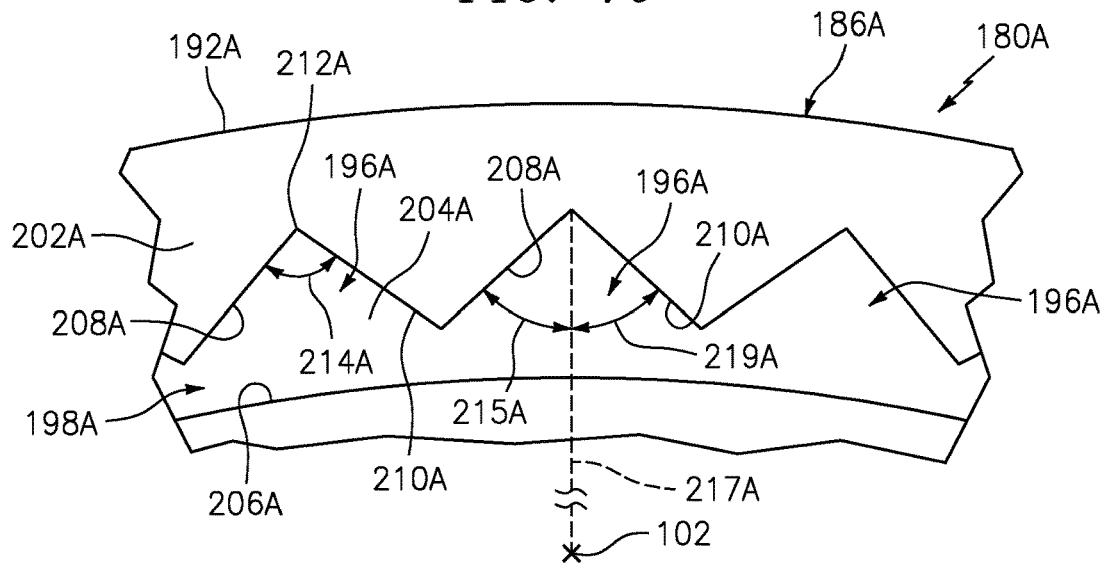
FIG. 11 is a partial illustration of an axial end of the rim of FIG. 5.

Referring to FIG. 10, each of the first disk pockets 196A projects axially along the axial centerline 102 partially into first rim 186A from an axial interior side 202A of the first rotor disk 180A to a first disk pocket end surface 204A. Referring to FIGS. 10 and 11, each of the first disk pockets 196A extends radially within the first rim 186A from a first disk pocket inner (e.g., bottom) surface 206A to a pair of first disk pressure surfaces 208A and 210A. Each of the first disk pockets 196A extends laterally within the first rim 186A between the pair of first disk pressure surfaces 208A and 210A as well as between circumferentially neighboring first disk pockets 196A.

The first disk pocket end surface 204A extends radially between the first disk pocket inner surface 206A and the pair of first disk pressure surfaces 208A and 210A. The first disk pocket end surface 204A extends laterally between the pair of first disk pressure surfaces 208A and 210A. In the embodiment of FIG. 11, the first disk pocket end surface 204A also extends laterally between pressure surfaces 208A, 210A of circumferentially neighboring first disk pockets 196A. The first disk pocket end surface 204A thereby may axially enclose an axial end of a respect first disk pocket 196A; see FIG. 10.

The first disk pressure surface 208A is arranged to a first lateral side of the first disk pocket 196A and the first disk pressure surface 210A is arranged to a second lateral side of the first disk pocket 196A. The first disk pressure surfaces 208A and 210A may meet (e.g., be joined) at an outer peak 212A of the first disk pocket 196A. The first disk pressure surfaces 208A and 210A may thereby radially enclose the respective first disk pocket 196A within the first rim 186A.

Each of the first disk pressure surfaces 208A and 210A of FIG. 11 is a substantially planar surface. However, in other embodiments, the first disk pressure surface 208A and/or the first disk pressure surface 208B may have a non-planar (e.g., curved and/or compound angled) geometry. The first disk pressure surfaces 208A and 210A are angularly offset from one another by an included angle 214A. This angle 214A may be greater than sixty degrees (60°) and less than one hundred and forty degrees (140°). The present disclosure, however, is not limited to such exemplary angles. In general, the disk pressure surfaces 208A and 210A are configured to compliment the attachment pressure surfaces 154 and 156 to facilitate engagement between the mount attachments 116 and the first rotor disk 180A as described below in further detail; however, such a correspondence is not required. Furthermore, while an angle 215A between the first disk pressure surface 208A and a ray 217A from the centerline 102 and an angle 219A between the first disk pressure surface 210A and the ray 217A are shown as equal in FIG. 11 (e.g., the first disk pocket 196A may be a symmetric first disk pocket), the angle 215A may alternatively be different (e.g., greater or less) than the angle 219A (e.g., the first disk pocket 196A may be an asymmetric first disk pocket) in other embodiments.

Referring to FIGS. 6 and 8, the first disk mounts 188A are arranged circumferentially around the axial centerline 102 in an annular array and are interposed with the first disk mount apertures 194A as described above. The first disk mounts 188A are radially aligned with the first disk mount apertures 194A; see also FIG. 7. Each first disk mount 188A of FIG. 6 is connected to (e.g., formed integral with) the first web 184A. Each first disk mount 188A projects axially out from and is cantilevered from the first web 184A in a first axial direction (e.g., an aft/downstream direction) to a distal first disk mount end 216A. Each first disk mount 188A may be configured with a first mount slot 218A proximate the first disk mount end 216A. This first mount slot 218A extends axially within the first disk mount 188A. The first mount slot 218A extends circumferentially through the first disk mount 188A. The first mount slot 218A extends radially outward and partially into the first disk mount 188A to a first slot end surface.

Figure 12:
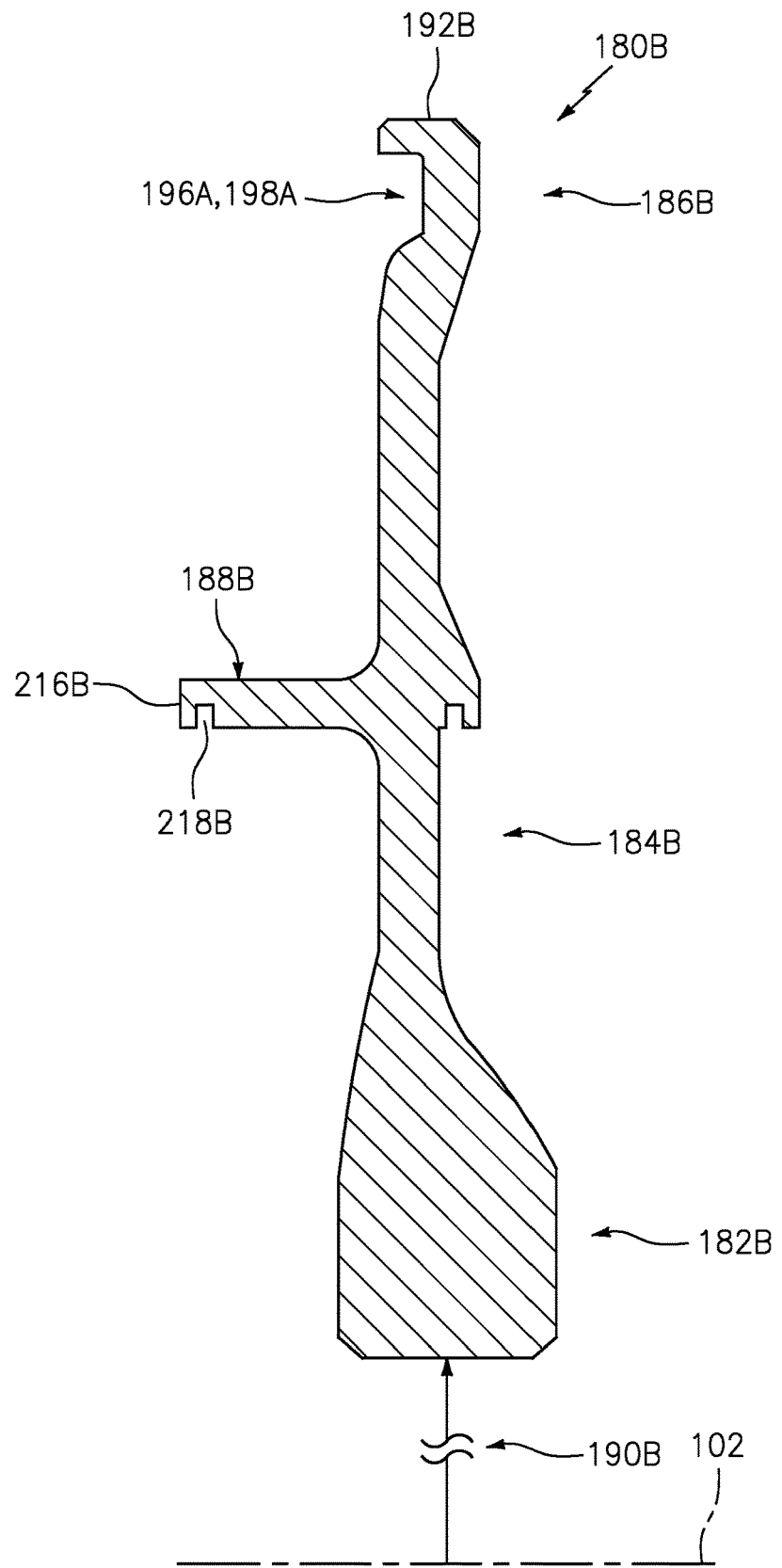
FIG. 12 is a partial, side sectional illustration of a second rotor disk of the rotor disk assembly of FIG. 5 at a first circumferential location.
Figure 13:
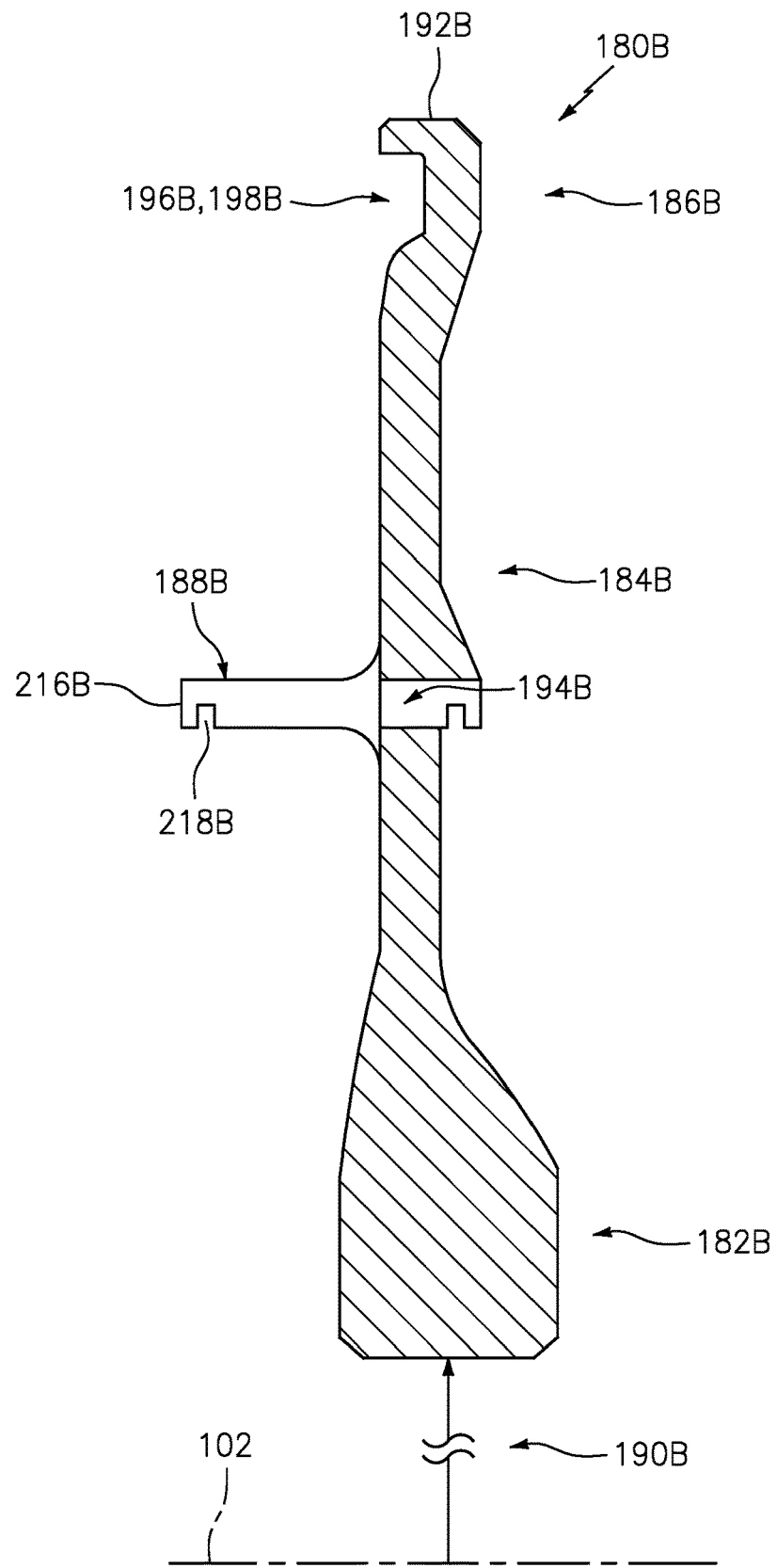
FIG. 13 is a partial, side sectional illustration of the second rotor disk of FIG. 5 at a second circumferential location.

The second rotor disk 180B of FIGS. 12 and 13 includes an inner second hub 182B, a second web 184B and an outer second rim 186B. The second rotor disk 180B of FIG. 12 also includes one or more second disk mounts 188B; see also FIG. 14.

The second hub 182B is an annular segment of the second rotor disk 180B and defines an inner bore 190B through the second rotor disk 180B. The second hub 182B may be configured as a rotating mass for the second rotor disk 180B. The second web 184B is connected to and extends radially between the second hub 182B and the second rim 186B. The second rim 186B is arranged at an outer distal end 192B of the second rotor disk 180B.

In general, the second rim 186B has an (e.g., maximum) axial width that is greater than an (e.g., maximum) axial width of the second web 184B. The axial width of the second rim 186B is less than an (e.g., maximum) axial width of the second hub 182B, where the axial width of the second hub 182B is also greater than the axial width of the second web 184B. The present disclosure, however, is not limited to the foregoing exemplary relationships. For example, in other embodiments, the axial width of the second rim 186B may be equal to the axial width of second hub 182B.

Referring to FIG. 13, the second web 184B is configured with one or more second disk mount apertures 194B (e.g., through-holes). These second disk mount apertures 194B may be radially intermediately located between the second hub 182B and the second rim 186B. Note, the second disk mount 188B in FIG. 13 is shown out of plane for reference in order to illustrate the relative positioning of aperture second disk mount apertures 194B.

Figure 14:
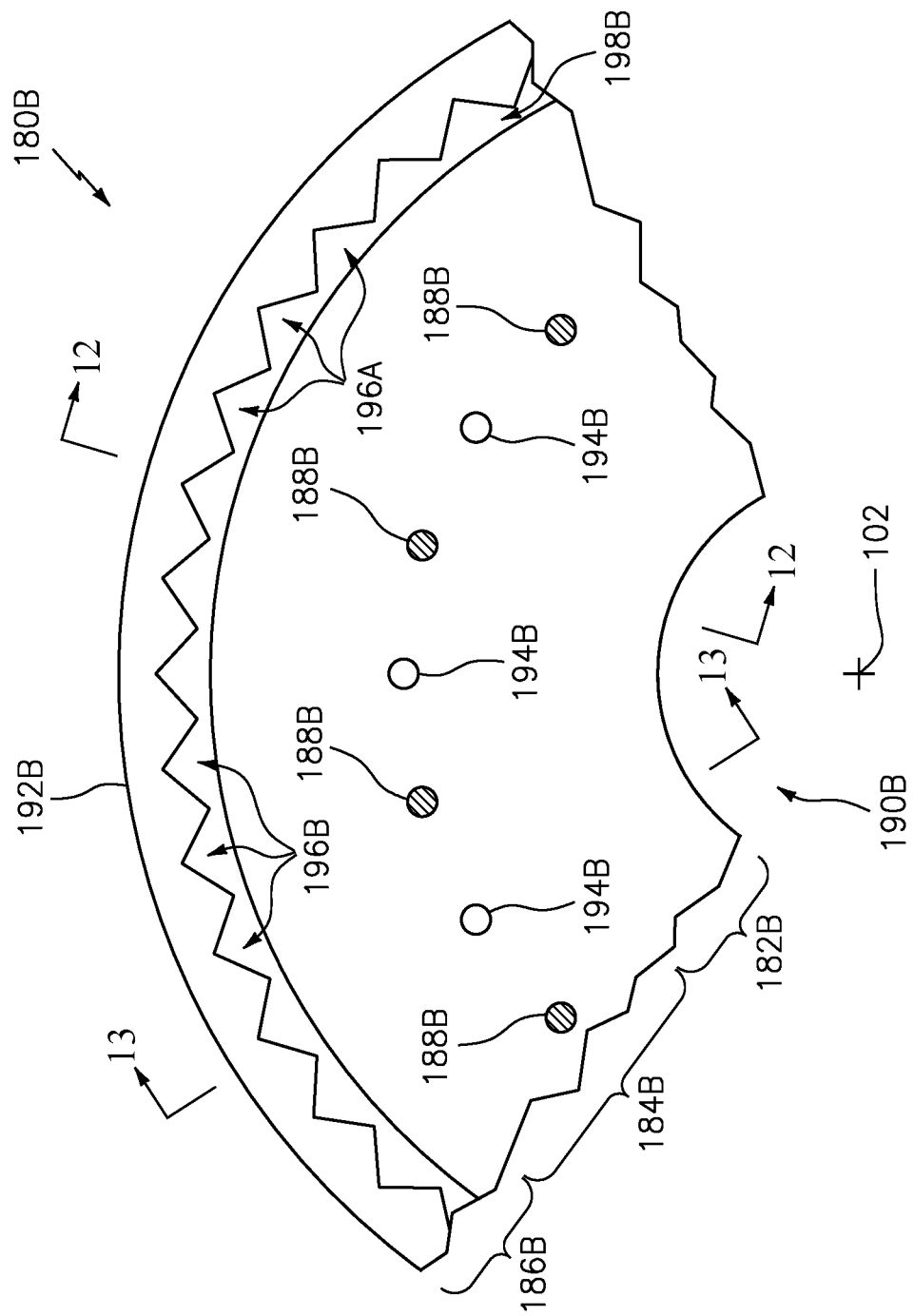
FIG. 14 is a partial, cross-sectional illustration of the second rotor disk of FIG. 5 taken along line 14-14 in FIG. 5.

Referring to FIG. 14, the second disk mount apertures 194B are arranged circumferentially around the axial centerline 102 in an annular array and are interposed with the second disk mounts 188B. For example, a respective one of the second disk mounts 188B may be positioned circumferentially between each circumferentially adjacent/neighboring pair of the second disk mount apertures 194B. Similarly, a respective one of the second disk mount apertures 194B may be positioned circumferentially between each circumferentially adjacent/neighboring pair of the second disk mounts 188B. Each of these second disk mount apertures 194B of FIG. 14 has a circular cross-sectional geometry. However, in other embodiments, one or more or each of the second disk mount apertures 194B may have a non-circular geometry (e.g., an elliptical cross-sectional geometry, a polygonal (e.g., rectilinear) cross-sectional geometry, etc.) or any other geometry selected to accommodate a respective one of the disk mounts 188A as described below.

Figure 15:
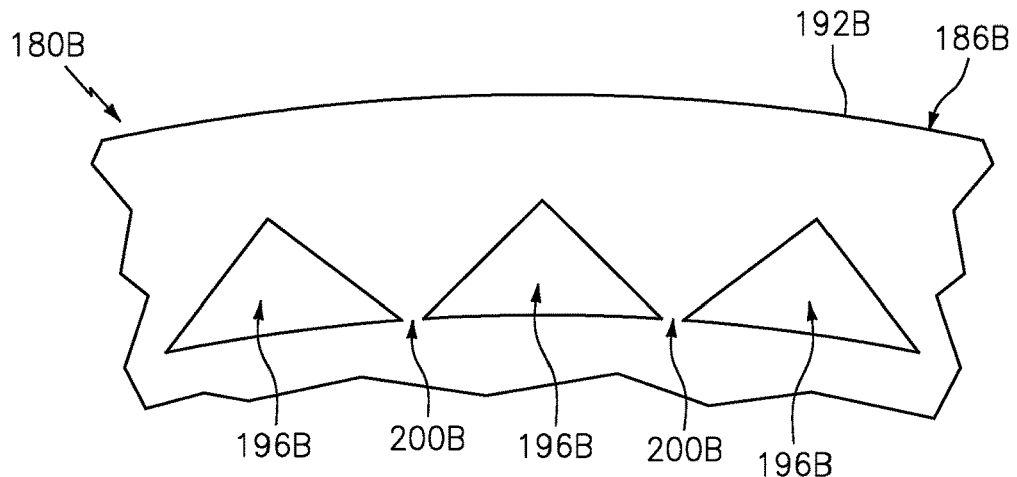
FIG. 15 is a partial illustration of an axial end of a rim of another second rotor disk.

Referring to FIGS. 12-14, the second rim 186B is configured with one or more second disk pockets 196B located at (e.g., on, adjacent or proximate) an outer end of the second rim 186B. These second disk pockets 196B are arranged circumferentially around the axial centerline 102 in an annular array. The second disk pockets 196B of FIG. 14 are circumferentially interconnected so as to form an annular groove 198B in the second rim 186B. However, in other embodiments, the second disk pockets 196B may be discrete from one another and separated by divider portions 200B of the second rim 186B as shown, for example, in FIG. 15.

Figure 16:
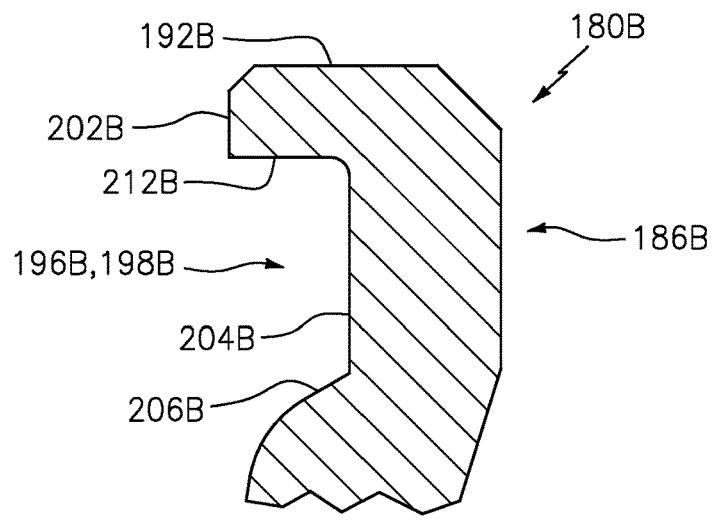
FIG. 16 is a partial, side sectional illustration of a rim of the second rotor disk of FIG. 5.
Figure 17:
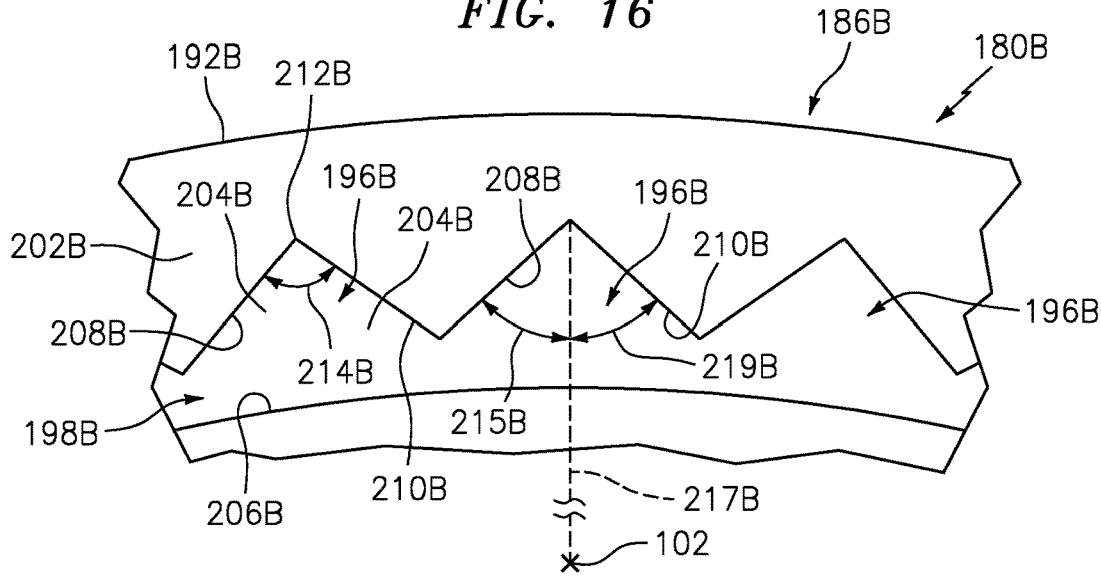
FIG. 17 is a partial illustration of an axial end of the rim of FIG. 5.

Referring to FIG. 16, each of the second disk pockets 196B projects axially along the axial centerline 102 partially into second rim 186B from an axial interior side 202B of the second rotor disk 180B to a second disk pocket end surface 204B. Referring to FIGS. 16 and 17, each of the second disk pockets 196B extends radially within the second rim 186B from a second disk pocket inner (e.g., bottom) surface 206B to a pair of second disk pressure surfaces 208B and 210B. Each of the second disk pockets 196B extends laterally within the second rim 186B between the pair of second disk pressure surfaces 208B and 210B as well as between circumferentially neighboring second disk pockets 196B.

The second disk pocket end surface 204B extends radially between the second disk pocket inner surface 206B and the pair of second disk pressure surfaces 208B and 210B. The second disk pocket end surface 204B extends laterally between the pair of second disk pressure surfaces 208B and 210B. In the embodiment of FIG. 17, the second disk pocket end surface 204B also extends laterally between pressure surfaces 208B, 210B of circumferentially neighboring second disk pockets 196B. The second disk pocket end surface 204B thereby may axially enclose an axial end of a respect second disk pocket 196B; see FIG. 16.

The second disk pressure surface 208B is arranged to a first lateral side of the second disk pocket 196B and the second disk pressure surface 210B is arranged to a second lateral side of the second disk pocket 196B. The second disk pressure surfaces 208B and 210B may meet (e.g., be joined) at an outer peak 212B of the second disk pocket 196B. The second disk pressure surfaces 208B and 210B may thereby radially enclose the respective second disk pocket 196B within the second rim 186B.

Each of the second disk pressure surfaces 208B and 210B of FIG. 17 is a substantially planar surface. However, in other embodiments, the second disk pressure surface 208B and/or the second disk pressure surface 210B may have a non-planar (e.g., curved and/or compound angled) geometry. The second disk pressure surfaces 208B and 210B are angularly offset from one another by an included angle 214B. This angle 214B may be greater than sixty degrees (60°) and less than one hundred and forty degrees (140°). The present disclosure, however, is not limited to such exemplary angles. In general, the disk pressure surfaces 208B and 210B are configured to compliment the attachment pressure surfaces 154 and 156 to facilitate engagement between the mount attachments 116 and the second rotor disk 180B as described below in further detail; however, such a correspondence is not required. Furthermore, while an angle 215B between the second disk pressure surface 208B and a ray 217B from the centerline 102 and an angle 219B between the second disk pressure surface 210B and the ray 217B are shown as equal in FIG. 17 (e.g., the second disk pocket 196B may be a symmetric second disk pocket), the angle 215B may alternatively be different (e.g., greater or less) than the angle 219B (e.g., the second disk pocket 196B may be an asymmetric second disk pocket) in other embodiments.

Referring to FIGS. 12 and 14, the second disk mounts 188B are arranged circumferentially around the axial centerline 102 in an annular array and are interposed with the second disk mount apertures 194B as described above. The second disk mounts 188B are radially aligned with the second disk mount apertures 194B; see also FIG. 13. Each second disk mount 188B of FIG. 12 is connected to (e.g., formed integral with) the second web 184B. Each second disk mount 188B projects axially out from and is cantilevered from the second web 184B in a second axial direction (e.g., a forward/upstream direction) to a distal second disk mount end 216B, which second axial direction is opposite the first axial direction. Each second disk mount 188B may be configured with a second mount slot 218B proximate the second disk mount end 216B. This second mount slot 218B extends axially within the second disk mount 188B. The second mount slot 218B extends circumferentially through the second disk mount 188B. The second mount slot 218B extends radially outward and partially into the second disk mount 188B to a second slot end surface.

Each rotor disks 180 and its various components may be configured as a monolithic body. The present disclosure, however, is not limited to such an exemplary configuration. For example, in other embodiments, the disk mounts 188A, 188B (generally referred to as "188") may be discrete from (e.g., removable from) each of the rotor disks 180 as described below in further detail.

Each of the rotor disks 180 may be configured from any suitable material such as, but not limited to, metal. Examples of the metal include, but are not limited to, nickel (Ni), titanium (Ti), aluminum (Al), chromium (Cr) or an alloy of one or more of the foregoing metals; e.g., a single crystal alloy or super alloy. The present disclosure, however, is not limited to the foregoing exemplary rotor disk materials, or metal in general. Referring to FIGS. 41-43, one or each of the rotor disks 180 may also include one or more reinforcing rings 400. These reinforcing ring(s) 400 are configured to assist the respective rotor disks 180 in carrying loads induced by rotation of the disk 180 and rotor assembly 100. These reinforcing ring(s) 400 may be integral with one or more disk elements (e.g., bonded into a pocket 402, 404 in or on the disk 180, bonded to a flange 406 on the disk 180) or mechanically attached with disk element(s). Each reinforcing ring 400 may be located within a respective rotor disk 180 (e.g., within the internal pocket 404; see FIG. 43), axially between the rotor disks 180 (e.g., in the pocket 402 and trapped between the webs 184; see FIG. 41) and/or on an outer surface of a respective rotor disk 180 (e.g., on the flange 406; see FIG. 42). Each reinforcing ring 400 may be configured as a segmented or unsegmented full hoop body. Each reinforcing ring 400 may be configured from and/or only include monolithic materials including metallic alloys, laminated or layered materials with two or more materials, or composite materials including metal matrix composite, ceramic matrix composites or organic matric composites. Furthermore, in some embodiments, the rotor assembly 100 may be configured with both internal and external reinforcing rings 400; e.g., any combination of the rings 400 of FIGS. 41-43.

Figure 18:
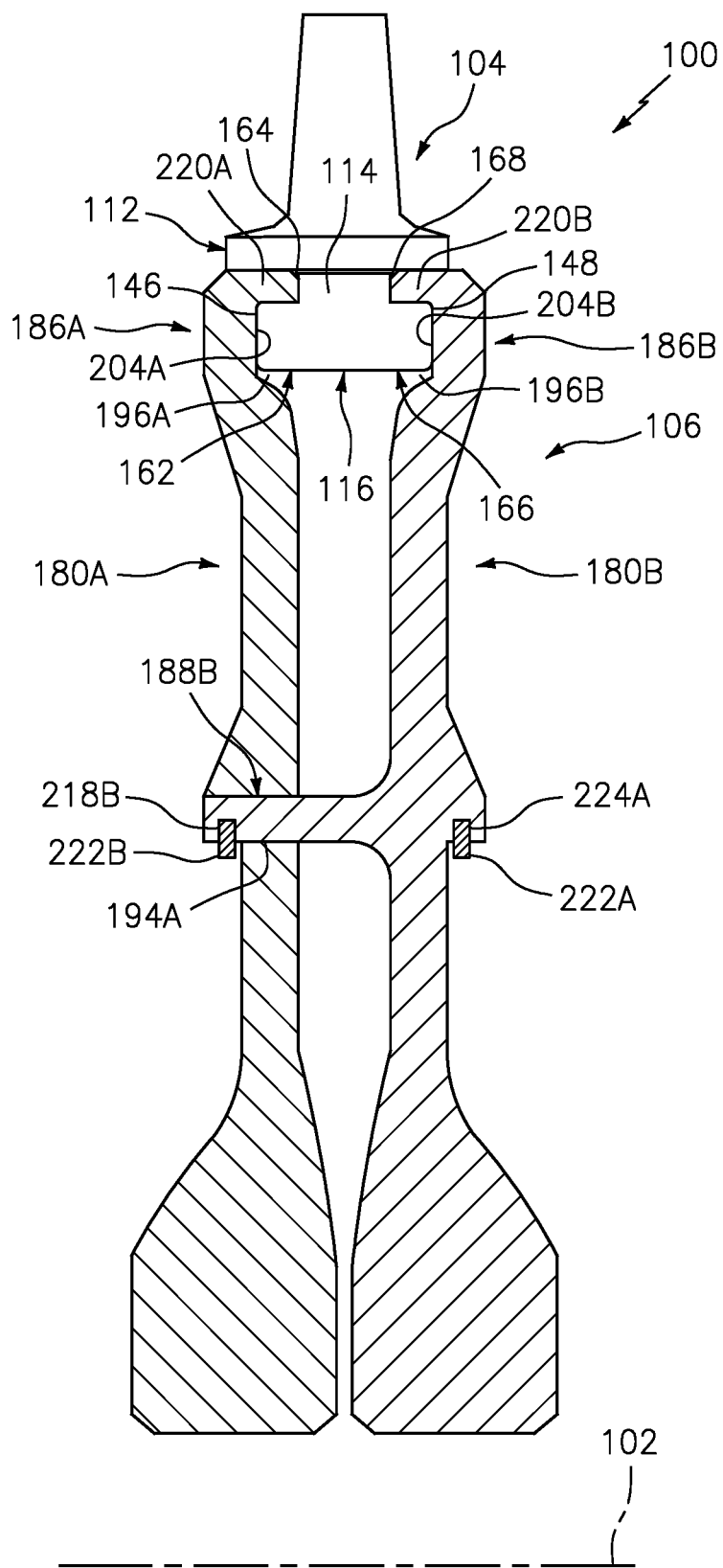
FIG. 18 is another partial, side sectional illustration of the rotor disk assembly of FIG. 5 at the first circumferential location.
Figure 19:
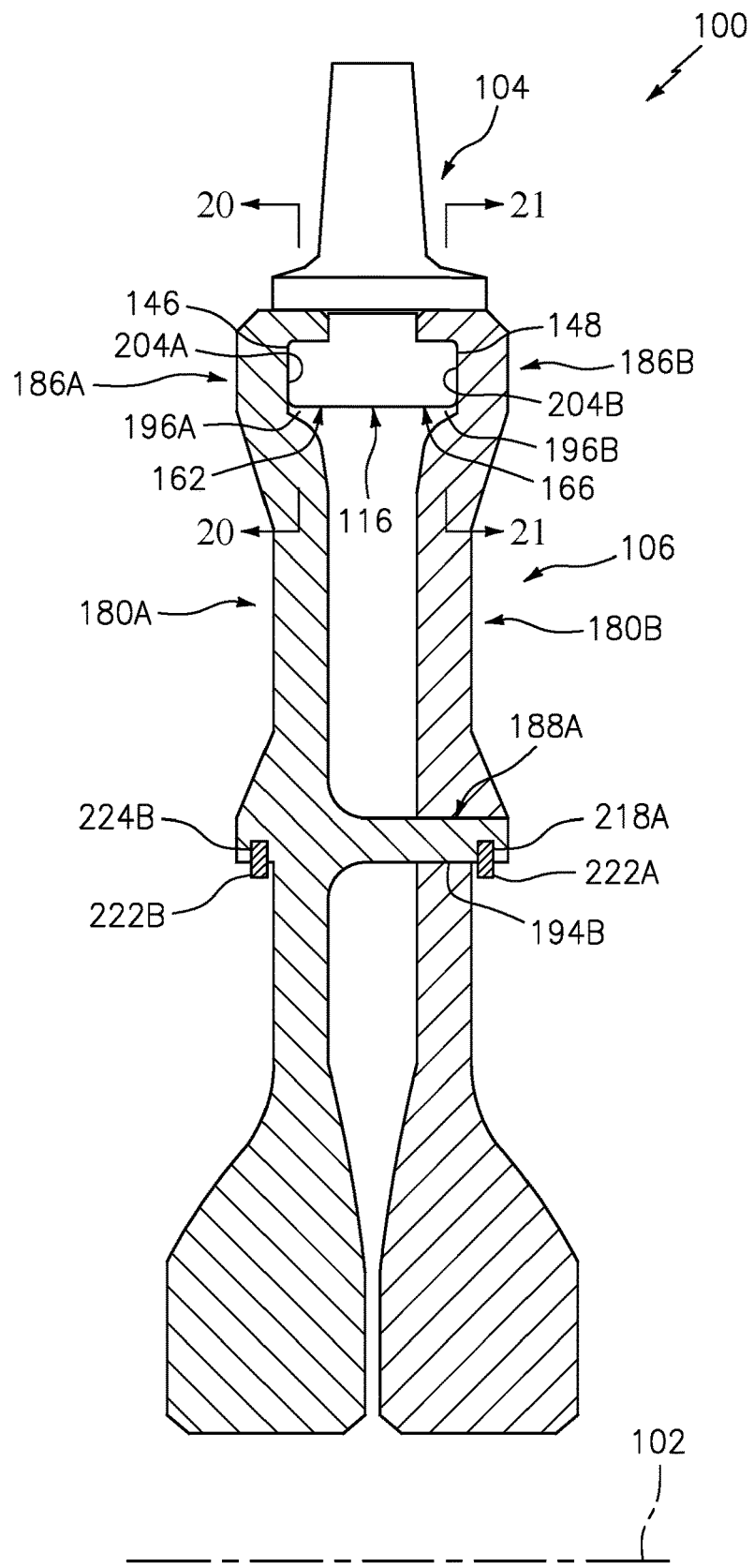
FIG. 19 is another partial, side sectional illustration of the rotor disk assembly of FIG. 5 at the second circumferential location.

Referring to FIGS. 18 and 19, the rotor blades 104 are mated with the first rotor disk 180A and the second rotor disk 180B. The rotor blades 104, for example, are arranged circumferentially around the axial centerline 102 in an annular array, and captured between and mounted to the first rim 186A and the second rim 186B.

The axial first end portion 162 of each mount attachment 116 is mated with a respective one of the first disk pockets 196A. In particular, the axial first end portion 162 of each mount attachment 116 projects axially (in the second axial direction) into the respective first disk pocket 196A. The attachment first axial side 146 is axially adjacent and may be abutted against (e.g., contact or otherwise engage) the first disk pocket end surface 204A. A portion of the first rotor disk 180A thereby extends laterally across and thereby laterally covers the respective mount attachment 116 and its axial first end portion 162.

Figure 20:
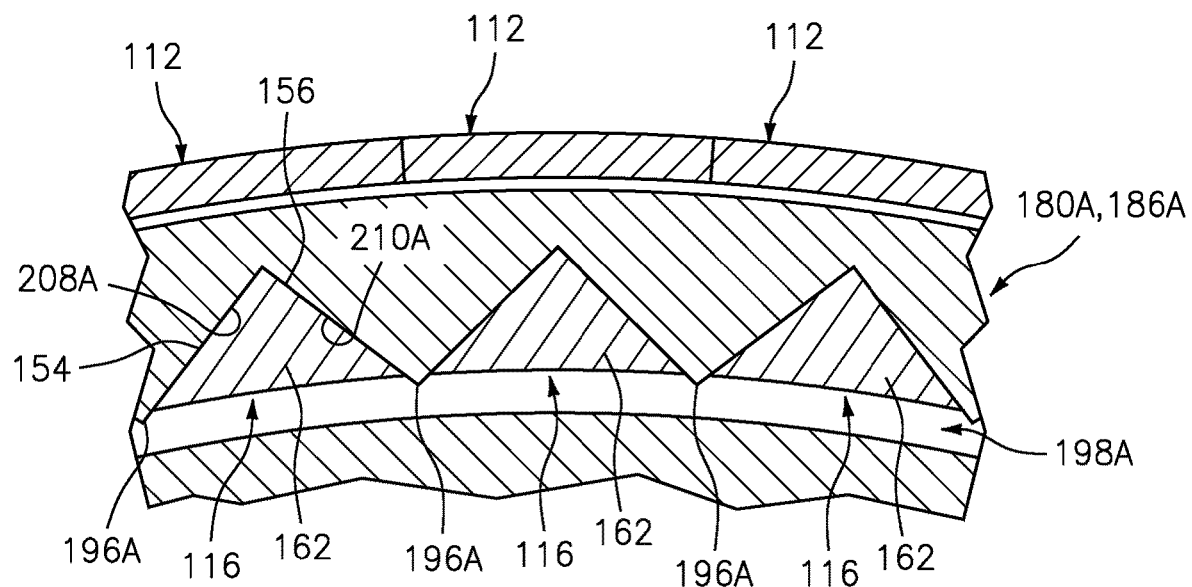
FIG. 20 is a partial, cross-sectional illustration of the rotor disk assembly at an interface between the rotor blades and the first rotor disk taken along line 20-20 in FIG. 19.

Referring to FIG. 20, the attachment pressure surface 154 is arranged adjacent and configured to engage (e.g., contact) the first disk pressure surface 208A. Similarly, the attachment pressure surface 156 is arranged adjacent and configured to engage the first disk pressure surface 210A. As best seen in FIG. 18, a portion 220A of the first rotor disk 180A projects axially into the first gap 164. The first disk portion 220A is thereby disposed radially between the axial first end portion 162 of the respective mount attachment 116 and the respective mount platform 112; see also FIG. 20.

With the foregoing interface between the first rotor disk 180A and the rotor blades 104, the first rotor disk 180A may substantially (e.g., completely) radially and circumferentially cover the mount attachments 116 and the mount necks 114. This configuration reduces fluid leakage paths across the first rotor disk 180A and, thus, may eliminate or significantly reduce the need for additional sealing devices such as, but not limited to, a rotor disk cover plate for covering attachment slots.

Referring to FIGS. 18 and 19, the axial second end portion 166 of each mount attachment 116 is mated with a respective one of the second disk pockets 196B. In particular, the axial second end portion 166 of each mount attachment 116 projects axially (in the first axial direction) into the respective second disk pocket 196B. The attachment second axial side 148 is axially adjacent and may be abutted against (e.g., contact or otherwise engage) the second disk pocket end surface 204B. A portion of the second rotor disk 180B thereby extends laterally across and thereby laterally covers the respective mount attachment 116 and its axial second end portion 166.

Figure 21:
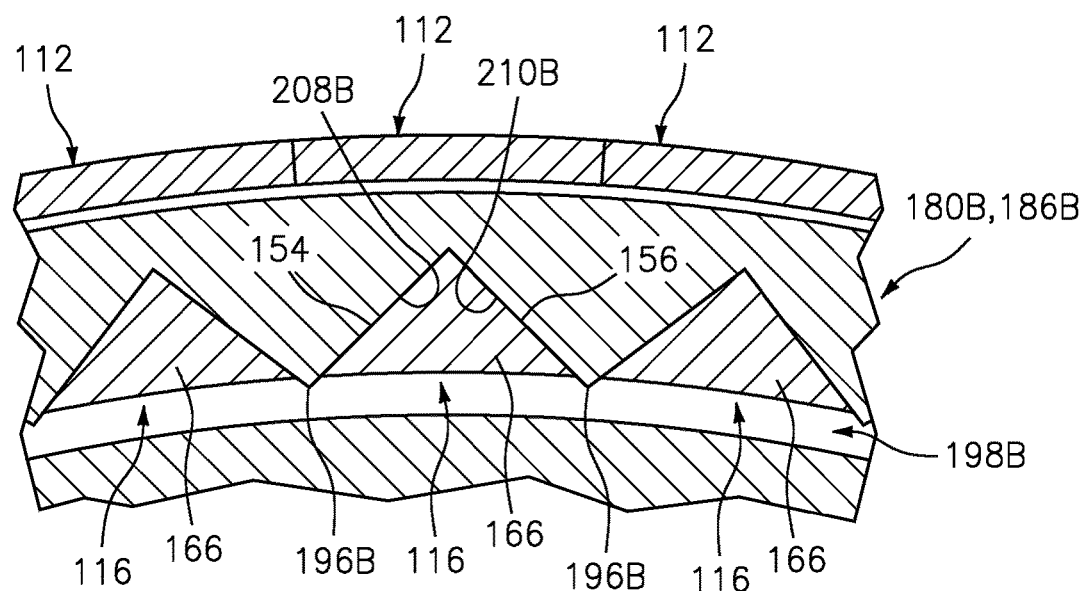
FIG. 21 is a partial, cross-sectional illustration of the rotor disk assembly at an interface between the rotor blades and the second rotor disk taken along line 21-21 in FIG. 19.

Referring to FIG. 21, the attachment pressure surface 154 is arranged adjacent and configured to engage (e.g., contact) the second disk pressure surface 208B. Similarly, the attachment pressure surface 156 is arranged adjacent and configured to engage the second disk pressure surface 210B. As best seen in FIG. 18, a portion 220B of the second rotor disk 180B projects axially into the second gap 168. The second disk portion 220B is thereby disposed radially between the axial second end portion 166 of the respective mount attachment 116 and the respective mount platform 112; see also FIG. 21.

With the foregoing interface between the second rotor disk 180B and the rotor blades 104, the second rotor disk 180B may substantially (e.g., completely) radially and circumferentially cover the mount attachments 116 and the mount necks 114. This configuration reduces fluid leakage paths across the second rotor disk 180B and, thus, may eliminate or significantly reduce the need for additional sealing devices such as, but not limited to, a rotor disk cover plate for covering attachment slots.

Referring to FIGS. 18 and 19, the first rotor disk 180A and the second rotor disk 180B are mated together. Each of the first disk mounts 188A, for example, may be aligned with a respective one of the second disk mount apertures 194B; see FIG. 19. Each of the second disk mounts 188B may be aligned with a respective one of the first disk mount apertures 194A; see FIG. 18. The first rotor disk 180A and the second rotor disk 180B may then be moved (e.g., translated) axially towards one another such that (A) the first disk mounts 188A respectively project axially through the second disk mount apertures 194B and (B) the second disk mounts 188B respectively project axially through the first disk mount apertures 194A. A first retention element 222A (e.g., a retention ring such as, but not limited to, a split ring) is mated with/seated in the slots 218A in the first disk mounts 188A (see FIG. 19) as well as associated slots 224A in the second rim 186B (see FIG. 18). Similarly, a second retention element 222B (e.g., a retention ring such as, but not limited to, a split ring) is mated with/seated in the slots 218B in the second disk mounts 188B (see FIG. 18) as well as associated slots 224B in the first rim 186A (see FIG. 19). The first disk mounts 188A and the second disk mounts 188B thereby connect the first rotor disk 180A and the second rotor disk 180B together.

In some embodiments, the second disk mounts 188B may be configured with the first rotor disk 180A such that all of the disk mounts are connected to (e.g., integral with) and project out from the first rotor disk 180A; e.g., similar to as shown in FIG. 6. In such embodiments, the second rotor disk 180B may be configured without any integral disk mounts (e.g., 188B) and may just include the second disk mount apertures 194B. Alternatively, the first disk mounts 188A may be configured with the second rotor disk 180B such that all of the disk mounts are connected to (e.g., integral with) and project out from the second rotor disk 180B; e.g., similar to as shown in FIG. 12. In such embodiments, the first rotor disk 180A may be configured without any integral disk mounts (e.g., 188A) and may just include the first disk mount apertures 194A.

Figure 22:
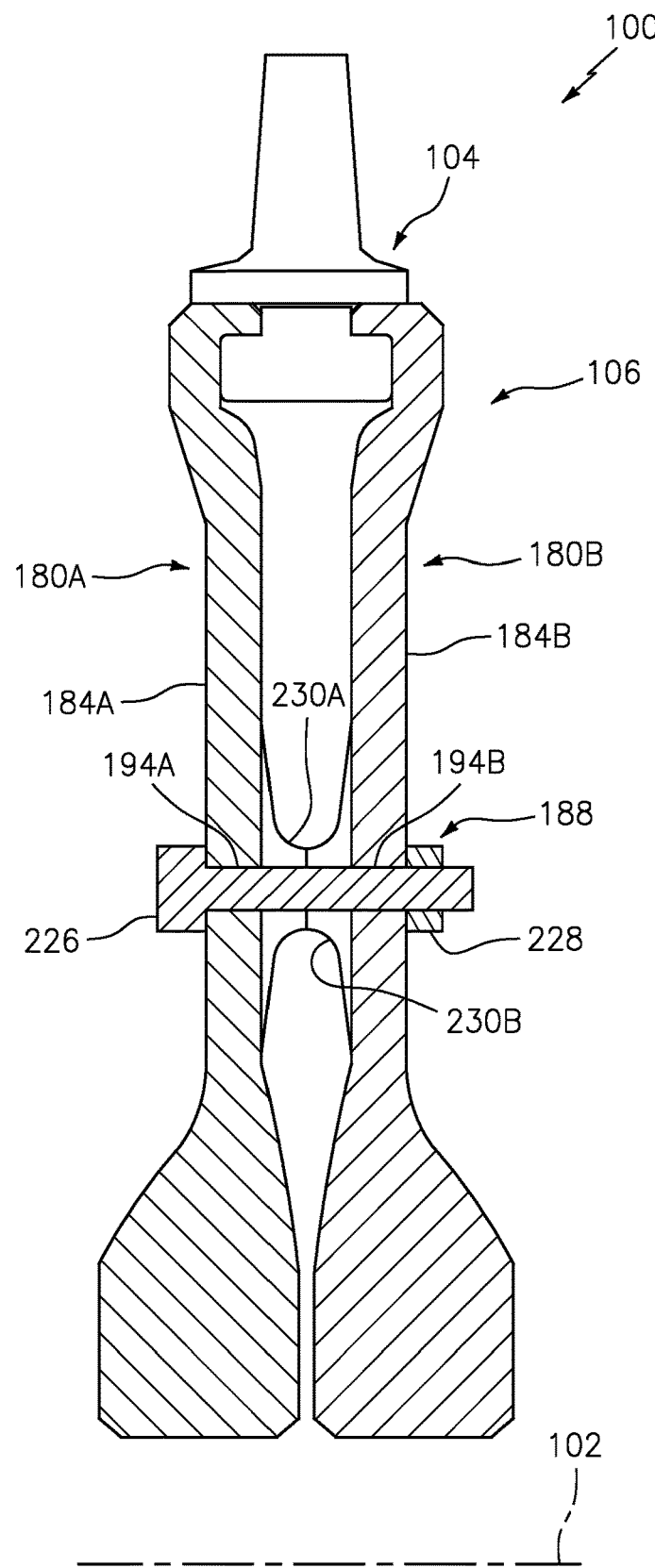
FIG. 22 is a partial, side sectional illustration of another rotor disk assembly.

In some embodiments, referring to FIG. 22, the first disk mounts 188A and/or the second disk mounts 188B may each be formed discrete from the rotor disks 180. For example, each disk mount 188 may alternatively be configured as a fastener such as, but not limited to, a tie rod/bolt 226 and a nut 228. In such embodiments, each disk mount 188 projects axially and sequentially through respective apertures 194A and 194B in the components 180A and 180B.

In some embodiments, one or more of the rotor disks 180 may each include one or more (e.g., a circumferential array) of standoffs 230A and 230B (generally referred to as "230"); e.g., axial projections. These standoffs 230 are configured to maintain an axial gap between the first rotor disk 180A and its first web 184A and the second rotor disk 180B and its second web 184B. The standoffs 230, for example, may prevent deformation of the first web 184A and the second web 184B axially towards one another when the disk mounts 188 are tightened and secured. In the embodiment of FIG. 22, each standoff 230A is configured to axially engage (e.g., contact) a respective one of the standoffs 230B. However, in other embodiments, each standoff 230A may directly axially engage the second web 184B and each standoff 230B may directly axially engage the first web 184A. In other embodiments, the first rotor disk 180A or the second rotor disk 180B may be configured with out the standoffs 230.

Figure 23:
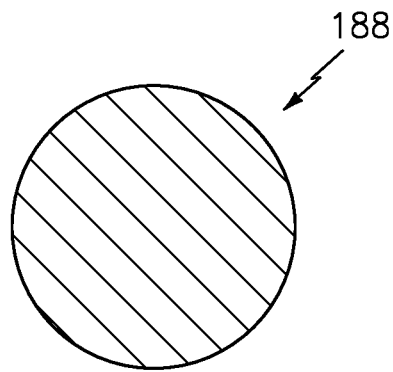
FIG. 23 is a cross-sectional illustration of a disk mount.
Figure 24:
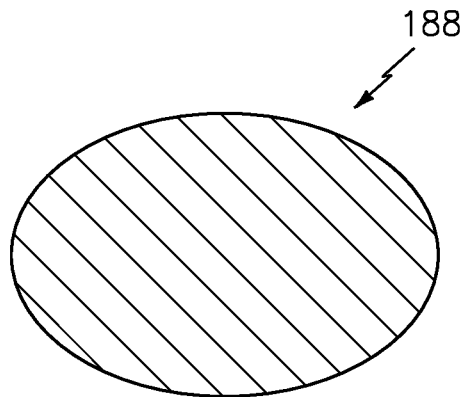
FIG. 24 is a cross-sectional illustration of another disk mount.
Figure 25:
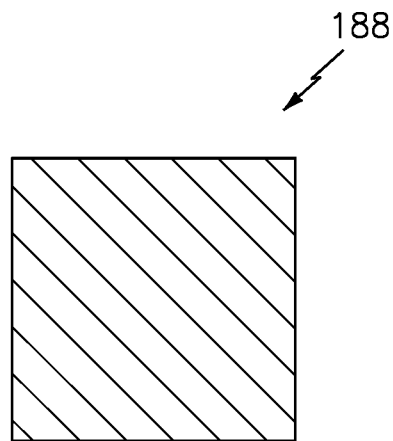
FIG. 25 is a cross-sectional illustration of still another disk mount.

In some embodiments, referring to FIG. 23, one or more or each of the disk mounts 188 may be configured with a circular cross-sectional geometry when viewed in a plane perpendicular to the axial centerline 102. In some embodiments, referring to FIG. 24, one or more or each of the disk mounts 188 may be configured with an elongated (e.g., oval, elliptical, etc.) cross-sectional geometry when viewed in a plane perpendicular to the axial centerline 102. In some embodiments, referring to FIG. 25, one or more or each of the disk mounts 188 may be configured with a polygonal (e.g., square, rectangular, triangular, etc.) cross-sectional geometry when viewed in a plane perpendicular to the axial centerline 102.

Figure 26:
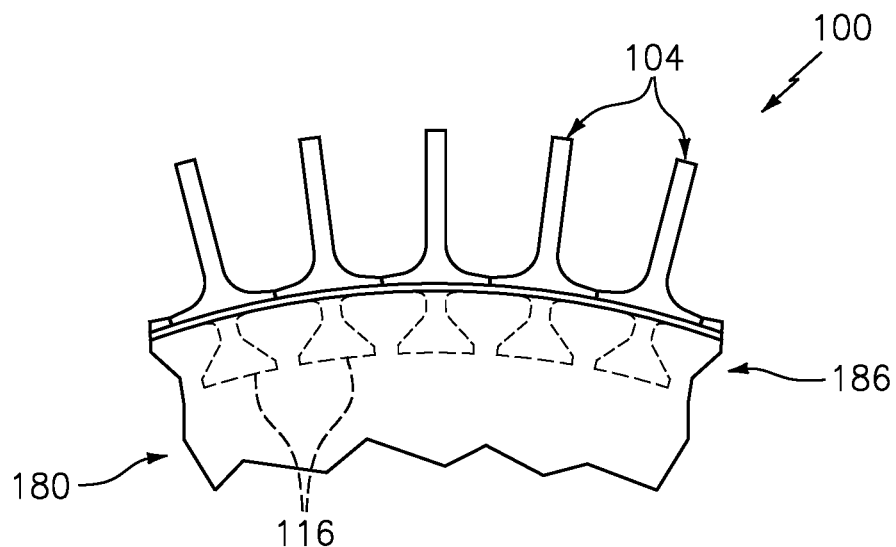
FIG. 26 is a partial illustration of an axial end of another rotor assembly with hidden rotor blade attachments shown in dashed lines.
Figure 27:
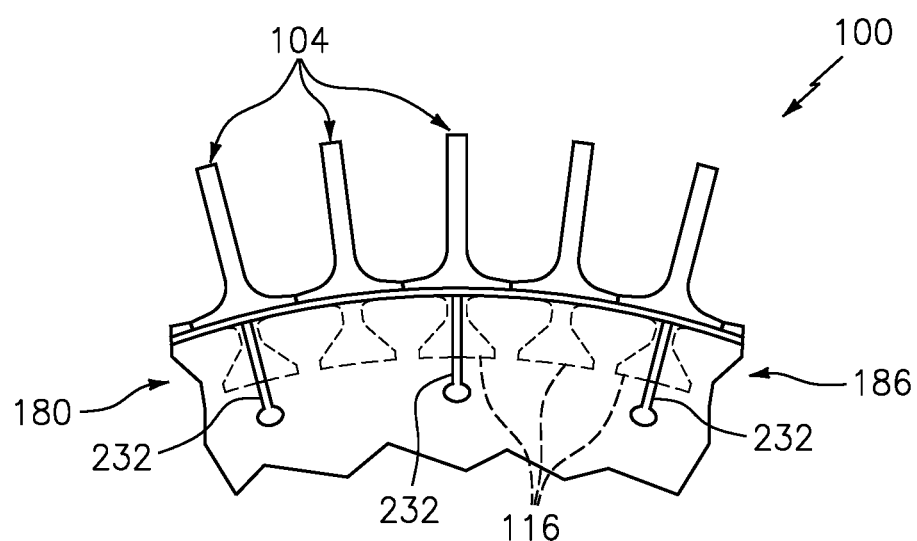
FIG. 27 is a partial illustration of an axial end of another rotor assembly with hidden rotor blade attachments shown in dashed lines.

In some embodiments, referring to FIG. 26, one or each rotor disk rim 186A and 186B (generally referred to as "186") may be configured as a circumferentially uninterrupted annular rim of the respective rotor disk 180. In other embodiments, referring to FIG. 27, one or each rotor disk rim 186 may be configured as a circumferentially interrupted annular rim. The rotor disk rim 186 of FIG. 27, for example, includes one or more (e.g., stress reduction) slots 232. Each of these slots 232 extends axially through the rotor disk rim 186 and may be aligned with a respective one of the rotor blades 104 and its mount attachment 116. However, the number of slots 232 may be selected to be less than the number of rotor blades 104 such that only a select number of the rotor blades 104 is aligned with a slot 232. For example, every other rotor blade 104/mount attachment 116 may be aligned with (e.g., radially and circumferentially overlapped by) one of the slots 232 such that the other mount attachments 116 are completely covered by the rotor disk 180 to reduce fluid leakage thereacross. The present disclosure, however, is not limited to the foregoing exemplary ratio between rotor blades 104 and slots 232. For example, in other embodiments, there could be a 3:1, 4:1, etc. ratio between the rotor blades 104 and the slots 232.

Figure 28:
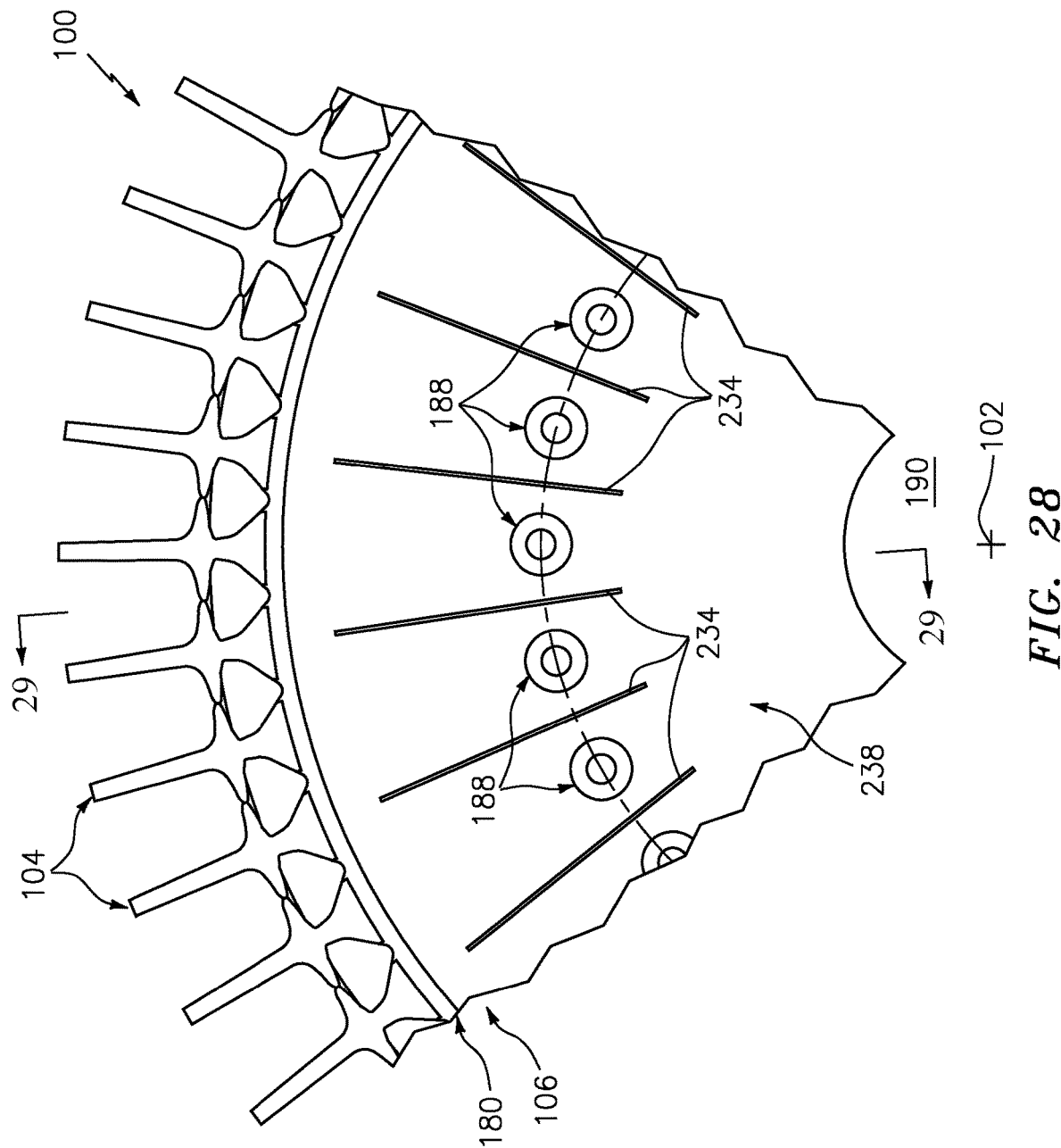
FIG. 28 is a partial illustration of another rotor assembly with a plurality of internal vanes.
Figure 29:
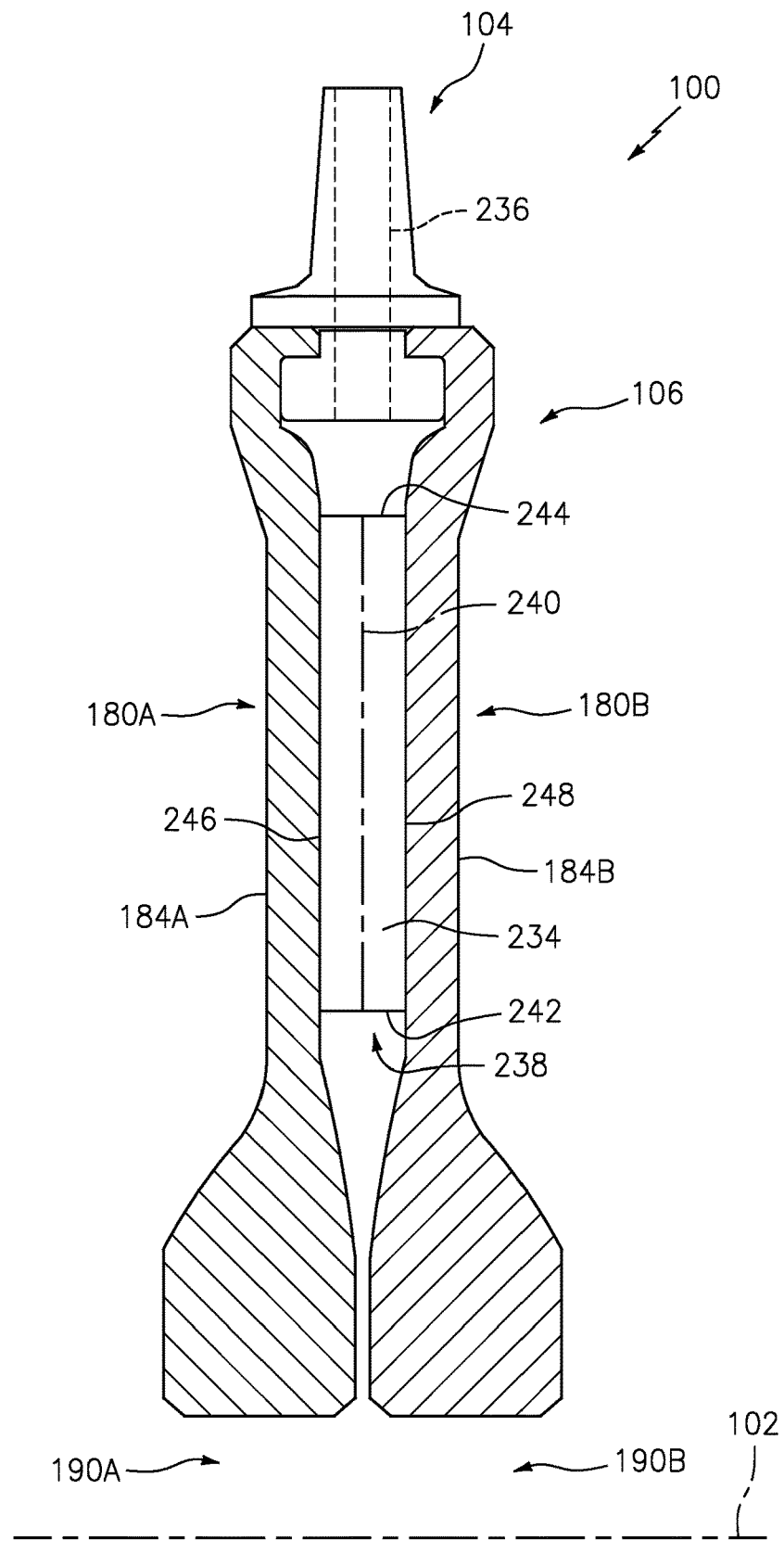
FIG. 29 is a partial, side sectional illustration of the rotor assembly of FIG. 28 taken along line 29-29 in FIG. 28.

In some embodiments, referring to FIGS. 28 and 29, the rotor assembly 100 may be configured with one or more internal vanes 234; e.g., fluid pumping vanes. These internal vanes 234 are configured to direct fluid (e.g., gas such as air) radially through the rotor disk assembly 106. The internal vanes 234 of FIGS. 28 and 29, for example, are configured to pump (e.g., flow and pressurize) the fluid (e.g., cooling air) received from one or both of the bores 190A and 190B (generally referred to as "190") radially, in a radial outward direction, through the rotor disk assembly 106 towards (e.g., to) the rotor blades 104. The fluid may thereby cool the rotor disk assembly 106 and its rotor disks 180. The fluid may then enter internal cooling passages in the rotor blades 104 (see exemplary passage 236 in FIG. 29) for cooling the rotor blades 104.

Referring to FIG. 29, each of the internal vanes 234 is arranged within an annulus 238 (e.g., an annular plenum, passage) axially between the first web 184A and the second web 184B. Each of the internal vanes 234 extends longitudinally (e.g., generally radially) along a centerline 240 of that vane 234 from a radial inner end 242 of that vane 234 to a radial outer end 244 of that vane 234. Each of the internal vanes 234 extends axially between a vane first side 246 and a vane second side 248. The vane first side 246 is located at a side of the first web 184A and the vane second side 248 is located at a side of the second web 184B. For example, each of the internal vanes 234 may be connected to (e.g., formed integral with) the first web 184A and may project axially out to its vane second side 248, where the second side 246 may axially contact or otherwise engage the second web 184B. In another example, each of the internal vanes 234 may be connected to (e.g., formed integral with) the second web 184B and may project axially out to its vane first side 246, where the first side 246 may axially contact or otherwise engage the first web 184A. In still another example, some of the internal vanes 234 may be connected to the first web 184A and may axially engage the second web 184B, and the remaining internal vanes 234 may be connected to the second web 184B and may axially engage the first web 184A. In such embodiments, the vanes 234 connected to the first web 184A may be interposed with the vanes 234 connected to the second web 184B.

Referring to FIG. 28, the internal vanes 234 are arranged circumferentially around the axial centerline 102 in an annular array. A circumferential distance between circumferentially neighboring internal vanes 234 may increase as those vanes extend radially outward away from the axial centerline 102.

In the specific embodiment of FIG. 28, the internal vanes 234 are interposed with the disk mounts 188. For example, a respective one of the disk mounts 188 may be located circumferentially between each circumferentially neighboring pair of the internal vanes 234. Similarly, a respective one of the internal vanes 234 may be located circumferentially between each circumferentially neighboring pair of the disk mounts 188. Of course, in other embodiments, more than one internal vane 234 may be located circumferentially between one or more or each circumferentially neighboring pair of the disk mounts 188, or vice versa. Furthermore, while the internal vanes 234 radially overlap circumferentially neighboring disk mounts 188 in FIG. 28, the internal vanes 234 may be positioned radially outward and/or inward of the circumferentially neighboring disk mounts 188 in other embodiments.

One or more or each of the internal vanes 234 may be formed integral with a respective one of the rotor disks 180 as described above. For example, the rotor disk 180 and the respective internal vanes 234 may be formed together from a single mass of material. Alternatively, the internal vanes 234 may be permanently bonded to the rotor disk 180 using one or more of the techniques described above, for example. However, in other embodiments, one or more of the internal vanes 234 may be removably mounted to the rotor disk assembly 106. For example, referring to FIGS. 30 and 31, the internal vanes 234 may be configured into a plurality of tubular structures 250 that are removably attached to one or each of the rotor disks 180.

Figure 30:
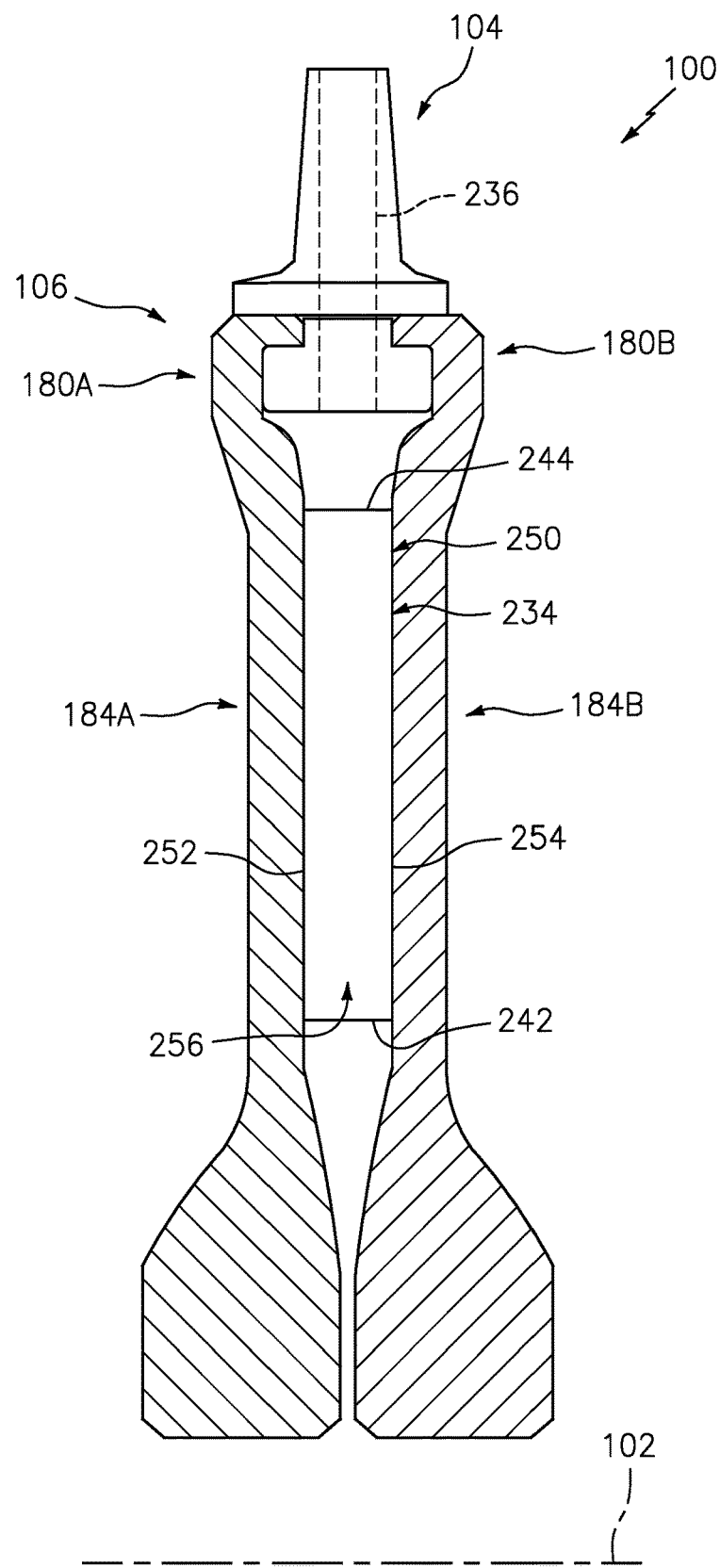
FIG. 30 is a partial, side sectional illustration of another rotor assemble with internal vanes; see line 30-30 in FIG. 32.
Figure 31:
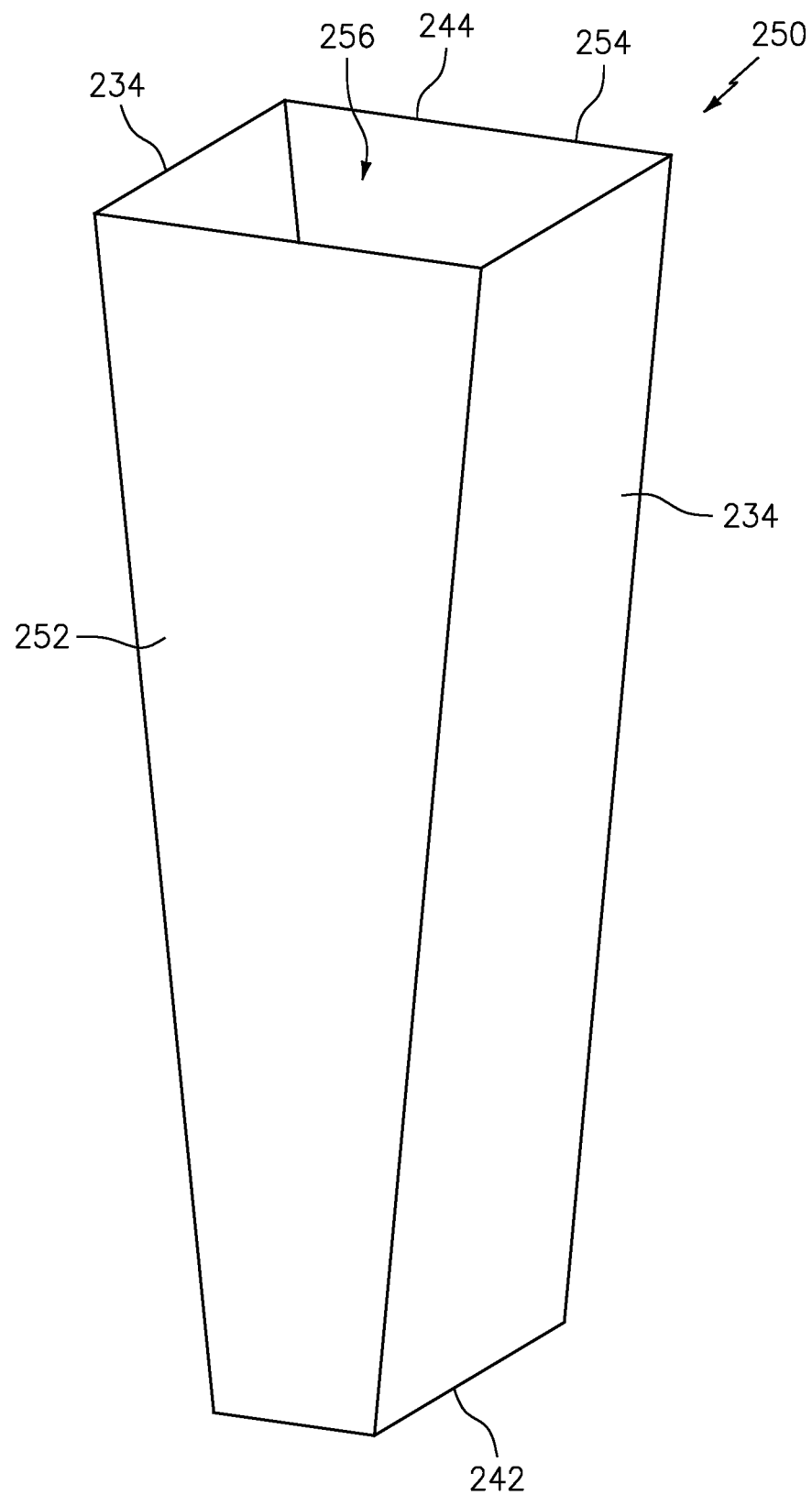
FIG. 31 is a perspective illustration of a tubular structure that includes a pair of the internal vanes.

Referring to FIG. 31, each tubular structure 250 includes a circumferentially neighboring pair of the internal vanes 234. Each tubular structure 250 also includes a first sidewall 252 and a second sidewall 254. The first sidewall 252 is disposed at an axial first side of the tubular structure 250, and extends laterally between and is connected to the internal vanes 234. The second sidewall 254 is disposed at an axial second side of the tubular structure 250, and extends laterally between and is connected the internal vanes 234. Each tubular structure 250 is thereby configured with an internal passage 256 which is fluidly coupled with the passage(s) 236 in a respective one (or more) of the rotor blades 104; see FIG. 30.

Figure 32:
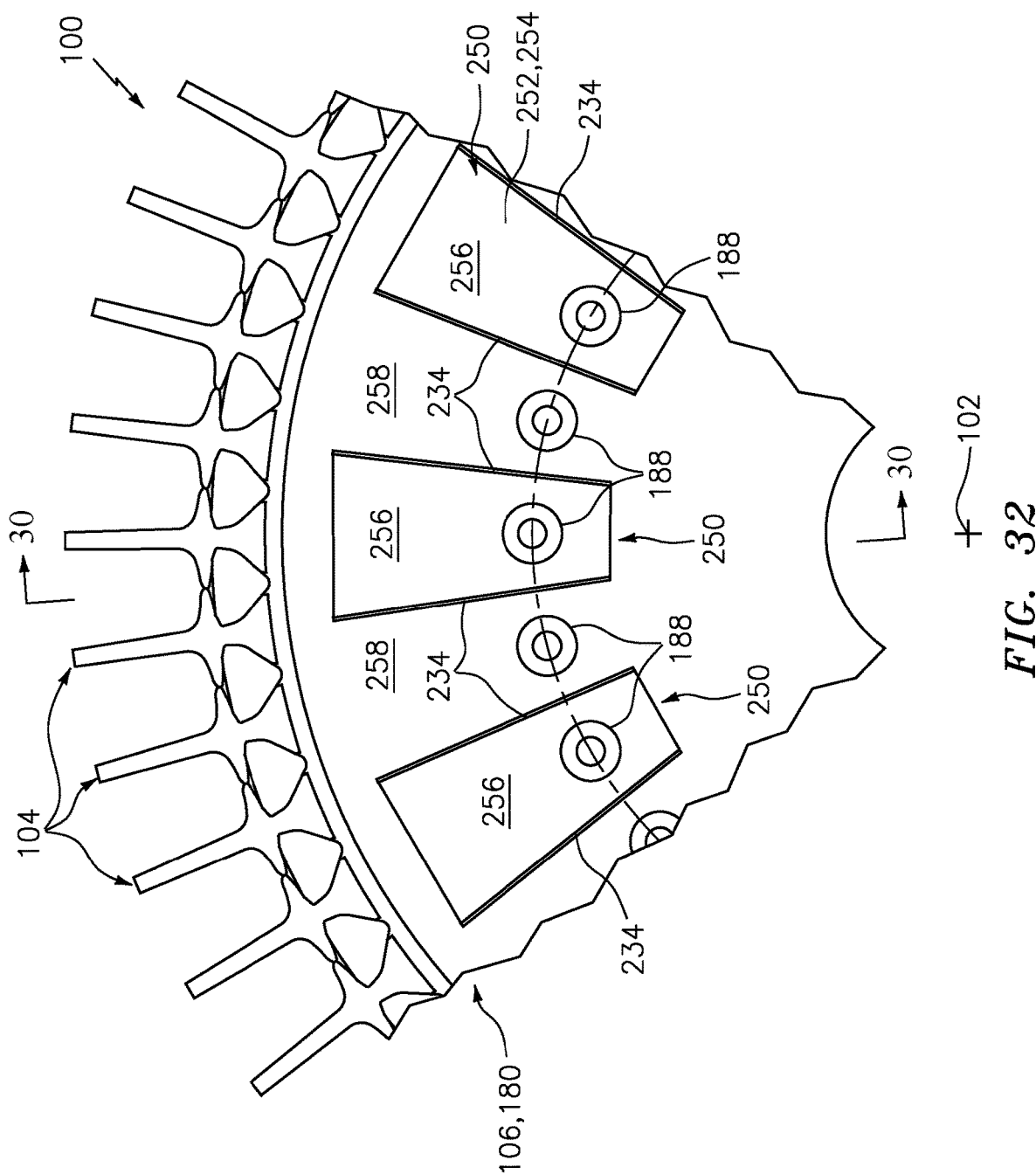
FIG. 32 is a partial illustration of the rotor assembly of FIG. 30.

Referring to FIG. 32, the tubular structures 250 are arranged circumferentially about the axial centerline 102 in an annular array. Circumferentially neighboring tubular structures 250 may be circumferentially spaced from one another so as to form exterior passages 258 therebetween, where each exterior passage 258 is fluidly coupled with the passage(s) 236 in a respective one (or more) of the rotor blades 104; see FIG. 30.

In the specific embodiment of FIG. 32, the internal vanes 234 are interposed with the disk mounts 188 in a similar fashion as described above. With this configuration, a respective one of the disk mounts 188 may be located circumferentially between each circumferentially neighboring pair of the tubular structures 250. In addition, a respective one of the disk mounts 188 may project axially through the first sidewall 252 and the second sidewall 254 of each tubular structure 250. Of course, in other embodiments, the disk mounts 188 may only be positioned in the gap between neighboring tubular structures 250. In still other embodiments, the disk mounts 188 may only be aligned with and, thus, project axially through the tubular structures 250.

Referring to FIG. 30, the axial first side and the first sidewall 252 of the tubular structure 250 is located at (e.g., abutted axially against or otherwise axially engaged with) the first web 184A. The axial second side and the second sidewall 254 of the tubular structure 250 is located at (e.g., abutted axially against or otherwise axially engaged with) the second web 184B.

Figure 33:
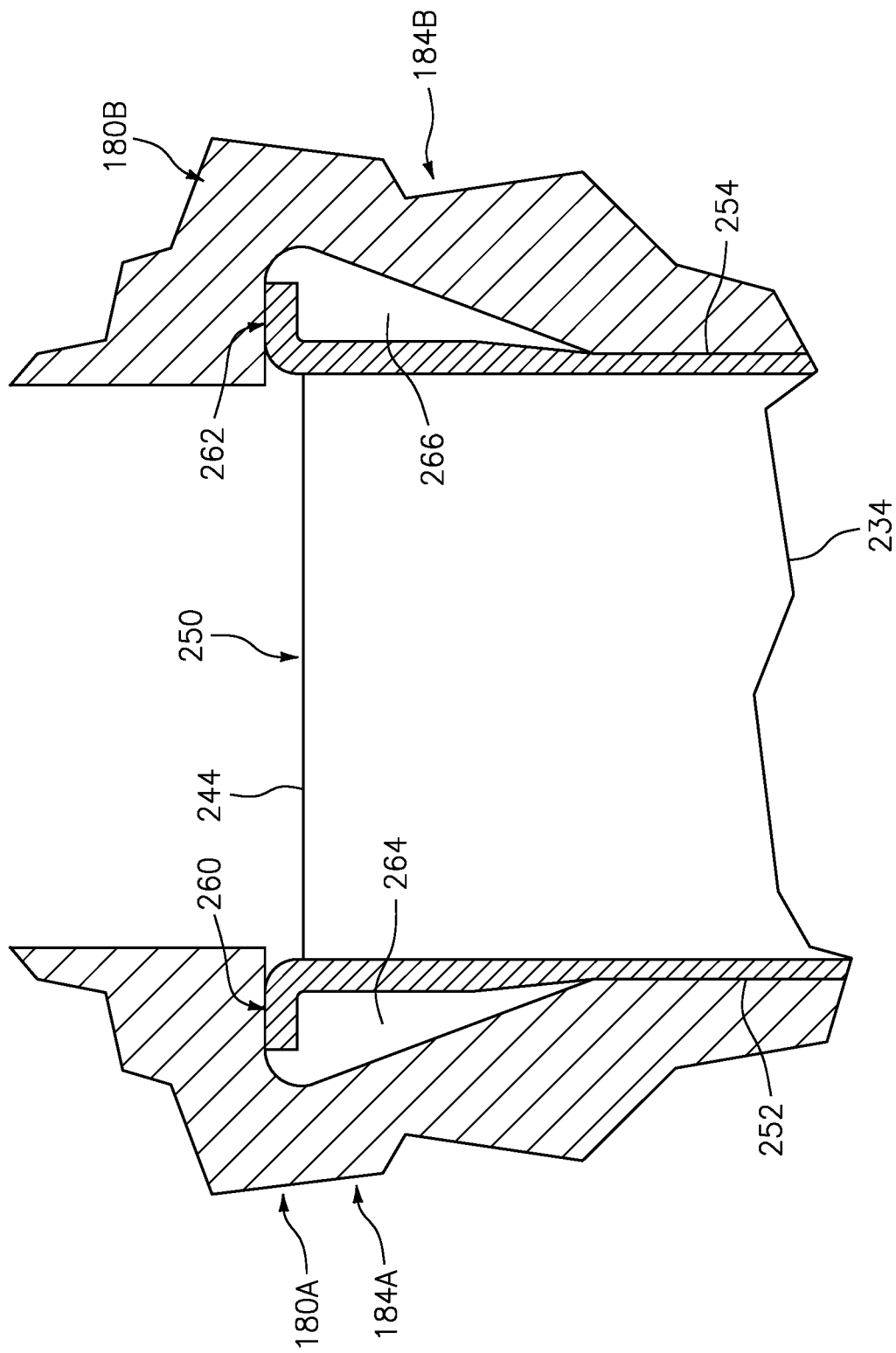
FIG. 33 is a partial, side sectional illustration of the rotor assembly of FIG. 30 depicting interfaces between the rotor disks and the tubular structures.

Referring to FIG. 33, the axial first side may be mounted to the first rotor disk 180A and the axial second side may be mounted to the second rotor disk 180B. Each tubular structure 250, for example, may include a first mount 260 and a second mount 262. The first mount 260 of FIG. 33 is configured as a (e.g., cantilevered) first flange located at a distal radial outer end of the tubular structure 250. This first flange projects axially (in the second axial direction) into a first groove 264 in the first rotor disk 180A; e.g., in the first web 184A. The second mount 262 of FIG. 33 is configured as a (e.g., cantilevered) second flange located at the distal radial outer end of the tubular structure 250. This second flange projects axially (in the first axial direction) into a second groove 266 in the second rotor disk 180B; e.g., in the second web 184B.

Figure 34:
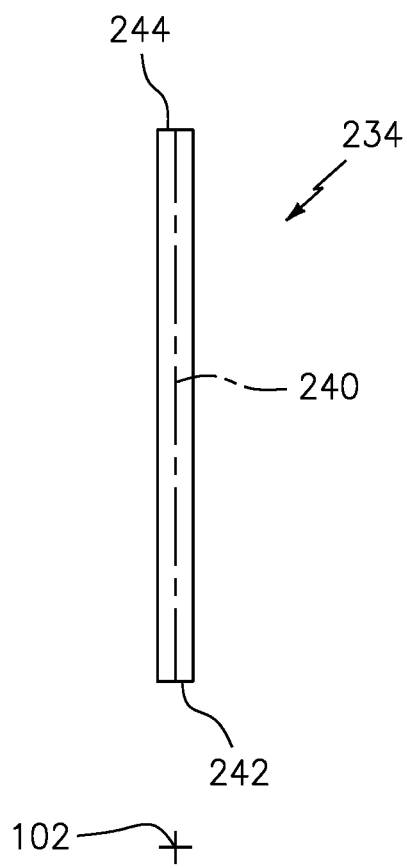
FIG. 34 is an illustration of an axial end of an internal vane.
Figure 35:
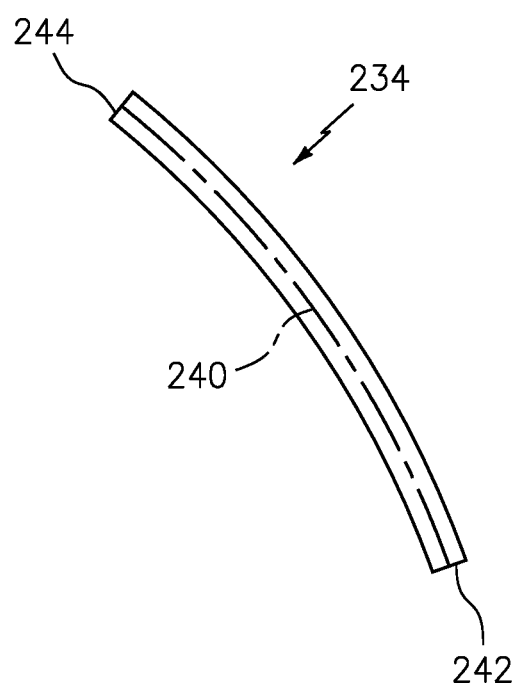
FIG. 35 is an illustration of an axial end of another internal vane.

Referring to FIG. 34, at least a portion (or an entirety) of each internal vane 234 and its centerline 240 may be straight. The internal vane 234 and the centerline 240 of FIG. 34, for example, is straight as those elements 234, 240 extend longitudinally between the radial inner end 242 and the radial outer end 244. At least a portion (or an entirety) of the internal vane 234 and the centerline 240 may also (or alternatively) be perpendicular to the axial centerline 102 when viewed, for example, in a plane perpendicular to the axial centerline 102. However, referring now to FIG. 35, at least a portion (or an entirety) of each internal vane 234 and its centerline 240 may be non-straight; e.g., curved, include angled segments, etc. The internal vane 234 and the centerline 240 of FIG. 35, for example, is curved (e.g., follows a spline, an elliptical or a circular geometry, etc.) as those elements 234, 240 extend longitudinally between the radial inner end 242 and the radial outer end 244. At least a portion (or an entirety) of the internal vane 234 and the centerline 240 may also (or alternatively) be non-perpendicular to (e.g., angularly offset from) the axial centerline 102 when viewed, for example, in a plane perpendicular to the axial centerline 102. The internal vanes 234 of the present disclosure, of course, are not limited to the foregoing exemplary sectional geometries.

Each of the internal vanes 234 (e.g., see FIGS. 28-32) as well as each of the tubular structures 250 and its various components (e.g., see FIGS. 30-32) is formed from vane material. This vane material may be the same as the rotor disk material, particularly where the internal vane(s) 234 are formed integral with the rotor disk(s) 180. Alternatively, the vane material may be different than the rotor disk material. For example, whereas the rotor disks 180 may be formed from metal, the internal vanes 234/the tubular structures 250 may be formed from non-metallic materials. The internal vanes 234/the tubular structures 250, for example, may be formed from a ceramic such as, but not limited to, a ceramic matrix composite (CMC) material. The elements 234, 250 may thereby me formed as light-weight and/or heat resistant components. The present disclosure, however, is not limited to the foregoing exemplary vane materials.

Figure 36:
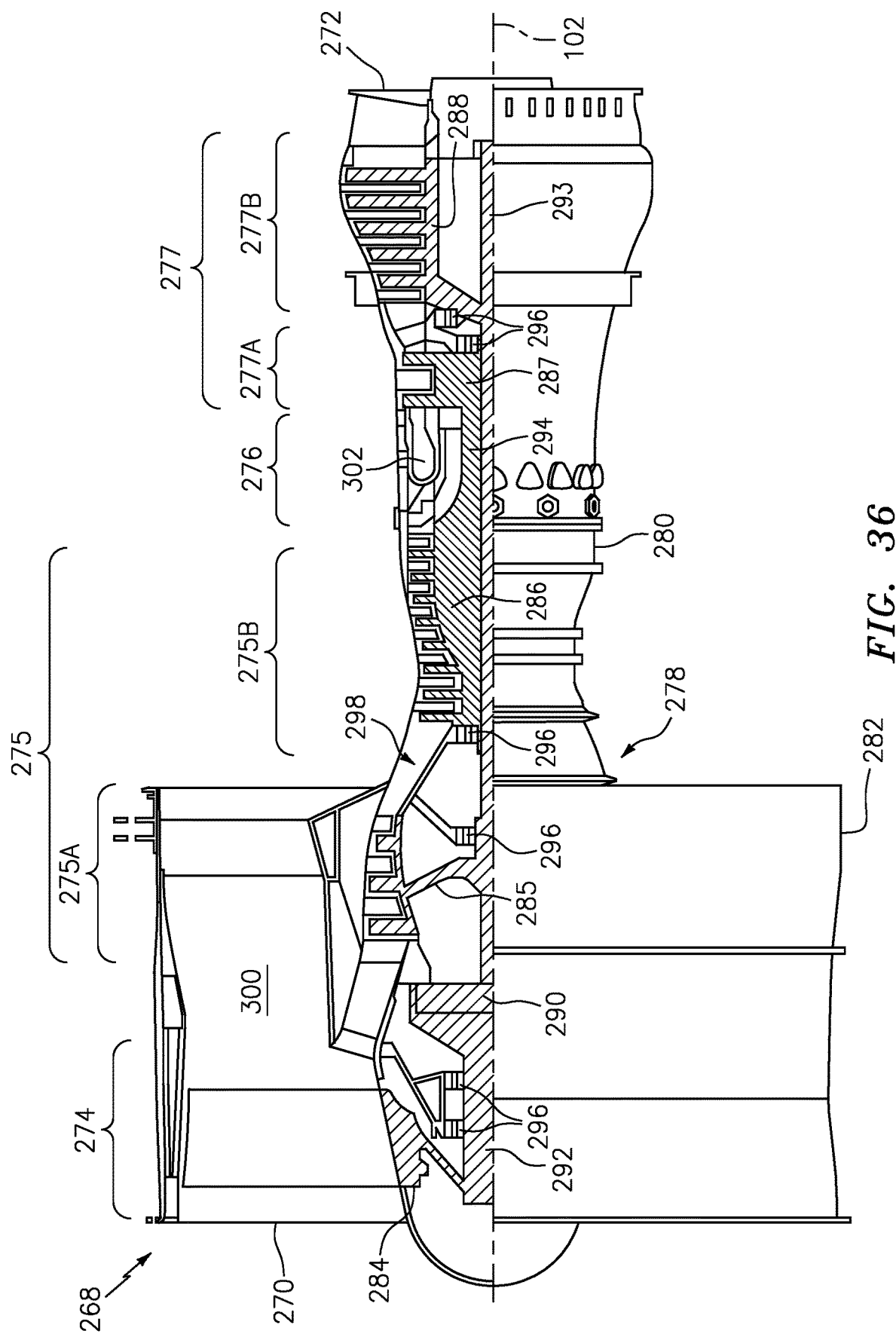
FIG. 36 is a side, cutaway illustration of a gas turbine engine.

FIG. 36 is a side cutaway illustration of a geared turbine engine 268 with which the rotor assembly 100 may be included. This turbine engine 268 extends along the axial centerline 102 between an upstream airflow inlet 270 and a downstream airflow exhaust 272. The turbine engine 268 includes a fan section 274, a compressor section 275, a combustor section 276 and a turbine section 277. The compressor section 275 includes a low pressure compressor (LPC) section 275A and a high pressure compressor (HPC) section 275B. The turbine section 277 includes a high pressure turbine (HPT) section 277A and a low pressure turbine (LPT) section 277B.

The engine sections 274-277 are arranged sequentially along the axial centerline 102 within an engine housing 278. This engine housing 278 includes an inner case 280 (e.g., a core case) and an outer case 282 (e.g., a fan case). The inner case 280 may house one or more of the engine sections 275A-277B; e.g., an engine core. The outer case 282 may house at least the fan section 274.

Each of the engine sections 274, 275A, 275B, 277A and 277B includes a respective rotor 284-288, any one of which may be configured as or may include the rotor assembly 100 of FIG. 1. The rotor assembly 100, for example, may be included in one of the turbine rotors 287 and 288. Each of the rotors 284-288 of FIG. 36 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 284 is connected to a gear train 290, for example, through a fan shaft 292. The gear train 290 and the LPC rotor 285 are connected to and driven by the LPT rotor 288 through a low speed shaft 293. The HPC rotor 286 is connected to and driven by the HPT rotor 287 through a high speed shaft 294. The shafts 292-294 are rotatably supported by a plurality of bearings 296; e.g., rolling element and/or thrust bearings. Each of these bearings 296 is connected to the engine housing 278 by at least one stationary structure such as, for example, an annular support strut.

During operation, air enters the turbine engine 268 through the airflow inlet 270. This air is directed through the fan section 274 and into a core gas path 298 (e.g., the gas path 118 in FIGS. 2 and 3) and a bypass gas path 300. The core gas path 298 extends sequentially through the engine sections 275A-277B. The air within the core gas path 298 may be referred to as "core air". The bypass gas path 300 extends through a bypass duct, which bypasses the engine core. The air within the bypass gas path 300 may be referred to as "bypass air".

The core air is compressed by the compressor rotors 285 and 286 and directed into a combustion chamber 302 of a combustor in the combustor section 276. Fuel is injected into the combustion chamber 302 and mixed with the compressed core air to provide a fuel-air mixture. This fuel air mixture is ignited and combustion products thereof flow through and sequentially cause the turbine rotors 287 and 288 to rotate. The rotation of the turbine rotors 287 and 288 respectively drive rotation of the compressor rotors 286 and 285 and, thus, compression of the air received from a core airflow inlet. The rotation of the turbine rotor 288 also drives rotation of the fan rotor 284, which propels bypass air through and out of the bypass gas path 300. The propulsion of the bypass air may account for a majority of thrust generated by the turbine engine 268, e.g., more than seventy-five percent (75%) of engine thrust. The turbine engine 268 of the present disclosure, however, is not limited to the foregoing exemplary thrust ratio.

The rotor assembly 100 and its components may be included in various turbine engines other than the one described above as well as in other types of rotational equipment. The rotor assembly 100 and its components, for example, may be included in a geared turbine engine where a gear train connects one or more shafts to one or more rotors in a fan section, a compressor section and/or any other engine section. Alternatively, the rotor assembly 100 and its components may be included in a turbine engine configured without a gear train. The rotor assembly 100 and its components may be included in a geared or non-geared turbine engine configured with a single spool, with two spools (e.g., see FIG. 36), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or rotational equipment.

Figure 37:
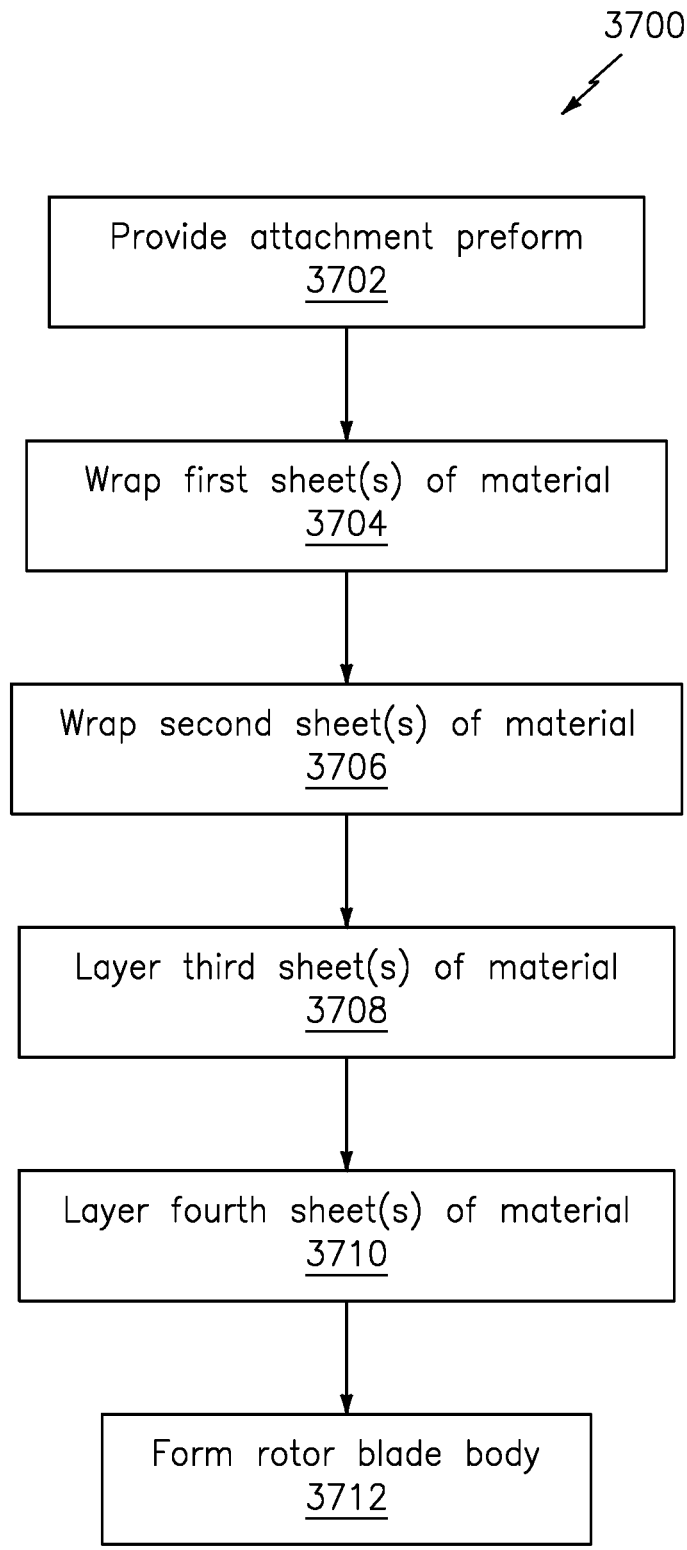
FIG. 37 is a flow diagram of a method for forming a rotor blade.

FIG. 37 is a flow diagram of a method 3700 for manufacturing a rotor blade. For ease of description, this method 3700 is described below with reference to forming one of the rotor blades 104 described above. The method 3700, however, is not limited to forming a rotor blade with the exemplary configurations described above with respect to the rotor blades 104.

Figure 38A:
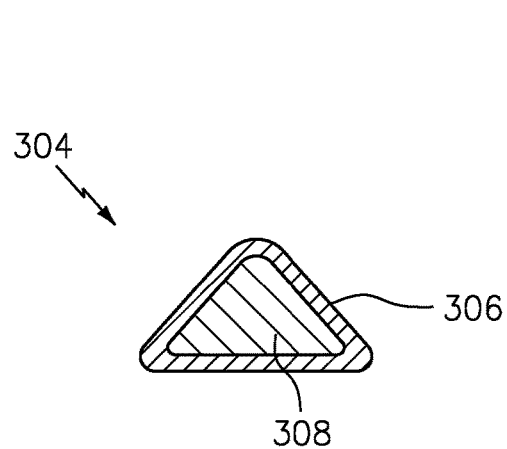
FIGS. 38A-38D schematically illustrate a sequence of steps performed during formation of a rotor blade.

In step 3702, an attachment preform 304 is provided. An exemplary embodiment of the attachment preform 304 is illustrated in FIG. 38A. This attachment preform 304 has a tubular body 306; e.g., a tubular outer shell. This tubular body 306 may be formed from one or more layers of material (e.g., see layers in FIG. 39), or may be configured from a three dimensional (3D) braided structure where fibers also extend through the thickness of the shell. The tubular body 306 may be hollow or filled with filler material 308. The filler material 308 may include a range of materials, examples of which may include, but are not limited to, chopped fibers, metallic or nonmetallic foam, and/or solid material. The attachment preform 304 is configured to form a base of the mount attachment 116; e.g., see FIGS. 39 and 40. The attachment preform 304 of FIG. 38A, for example, is configured with a flared (e.g., tapered, delta-shaped, triangular, etc.) cross-sectional geometry or otherwise dovetailed shaped cross-sectional geometry when viewed, for example, in a plane perpendicular to the axial centerline 102; e.g., plane of FIG. 38A. Referring to FIG. 40, this cross-sectional geometry (or variations thereto) may extend axially along an entire (or partial) length 310 of the attachment preform 304. The attachment preform length 310 may be between, for example, seventy percent (70%) and one-hundred percent (100%) of a length 312 of the mount attachment 116. The attachment preform length 310, for example, may be at least eighty, ninety or ninety-five percent of the mount attachment length 312. The present disclosure, however, is not limited to the foregoing exemplary relationship.

Figure 38B:
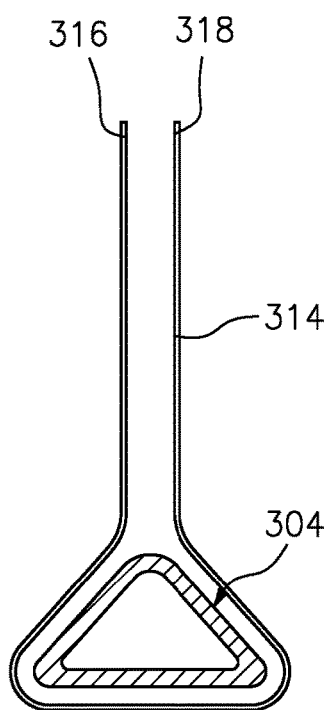
Figure 39:
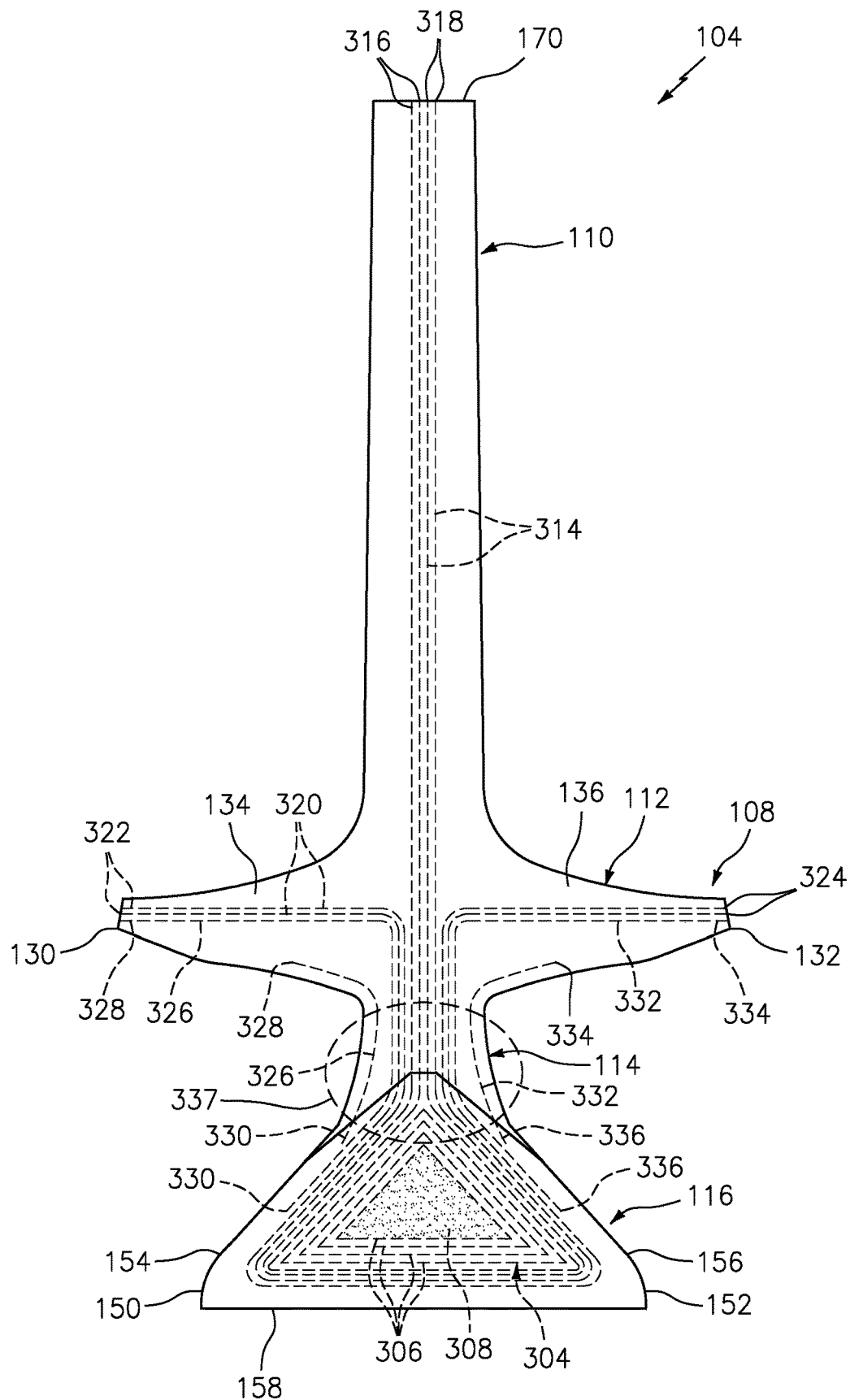
FIG. 39 illustrates a first axial end of a rotor blade with dashed lines depicting layers of material within the rotor blade.
Figure 40:
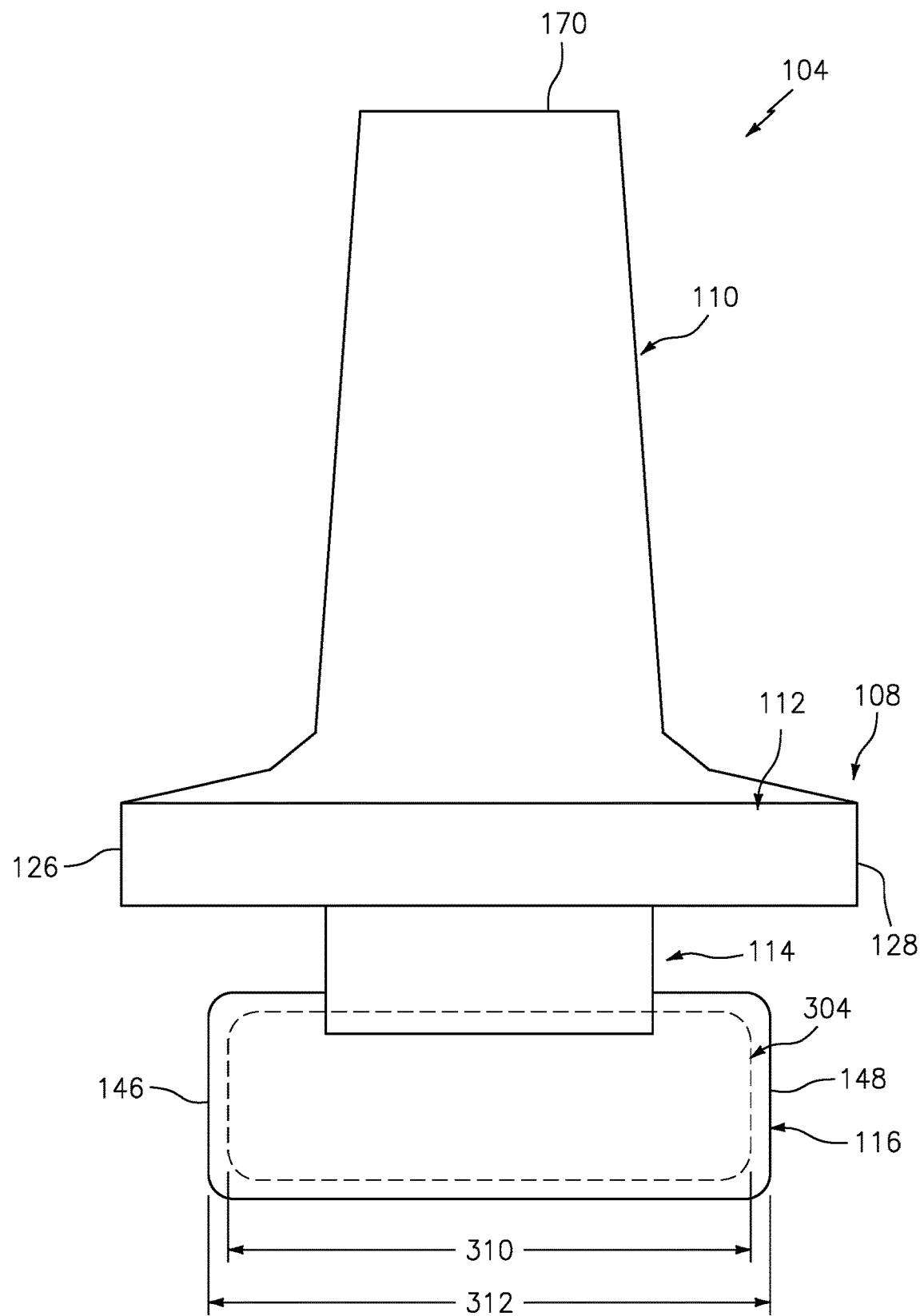
FIG. 40 illustrates a first lateral side of the rotor blade of FIG. 39 with dashed lines depicting an attachment preform within the rotor blade.

In step 3704, one or more first sheets of material 314 are wrapped (e.g., substantially completely) about the attachment preform 304 to form (1) another portion of the rotor blade mount 108 (e.g., 112, 114 and/or 116) and (2) at least a portion or an entirety of the airfoil 110; e.g., see FIG. 39. An exemplary embodiment of one of the first sheets of material 314 is illustrated in FIG. 38B. The first sheet of material 314 of FIG. 38B extends longitudinally along a length thereof between opposing distal ends 316 and 318. The first sheet of material 314 of FIG. 38B is wrapped about the attachment preform 304 such that its distal ends 316 and 318 are aligned radially outboard of the attachment preform 304. Referring to FIG. 39, each of the distal ends 316, 318 may be located at (e.g., on, adjacent or proximate) and may thereby form a portion of the rotor blade tip 170. Of course, in other embodiments, one or each of the distal ends 316, 318 may be located radially inward of the rotor blade tip 170. After wrapping around the attachment preform 304, in one alternate embodiment, the first sheet of material 314 may be stitched or sewn or connected via other techniques with similar or complementary fibers in order to connect one or more surfaces or regions, for example, at the distal ends 316 and 318. With the foregoing configuration, each first sheet of material 314 may thereby provide a structurally sound connection between the rotor blade airfoil 110 and the rotor blade mount 108 and its mount attachment 116.

Figure 38C:
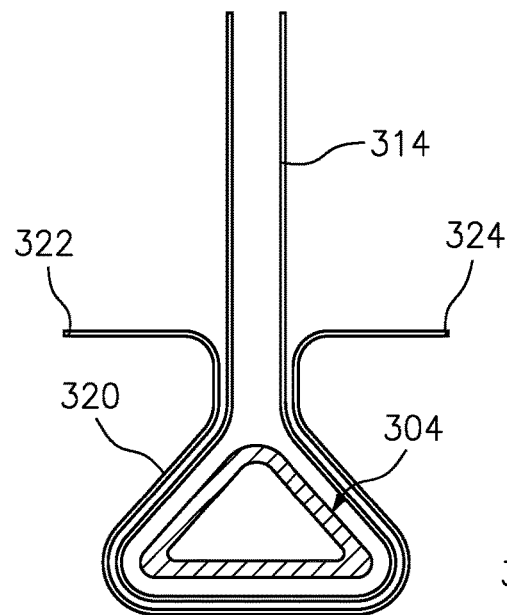

In step 3706, one or more second sheets of material 320 are wrapped about the attachment preform 304 and over the first sheet(s) of material 314 to form another portion of the rotor blade mount 108 (e.g., 112, 114 and/or 116); e.g., see FIG. 39. The second sheets of material 320 may be configured from one or more layers of woven material, or one or one or more layers of braided material. An exemplary embodiment of one of the second sheets of material 320 is illustrated in FIG. 38C. The second sheet of material 320 of FIG. 38C extends longitudinally along a length thereof between opposing distal ends 322 and 324. The second sheet of material 320 of FIG. 38C is wrapped (e.g., substantially completely or partially) about the attachment preform 304 such that its distal ends 322 and 324 are disposed to opposite lateral sides of the attachment preform 304; however, the ends 322 and 324 may be radially aligned. Referring to FIG. 39, the first distal end 322 may be located at the first lateral side 130 such that a corresponding portion of the second sheet of material 320 at least partially forms the lateral platform overhang 134. The second distal end 324 may be located at the second lateral side 132 such that a corresponding portion of the second sheet of material 320 at least partially forms the lateral platform overhang 136. Of course, in other embodiments, the first distal end 322 may be laterally recessed from the first lateral side 130 and/or the second distal end 324 may be laterally recess from the second lateral side 132. After wrapping around the attachment preform 304 and first sheet of material 314, in one alternate embodiment, the second sheet of material 320 may be stitched or sewn or connected via other techniques with similar or complementary fibers in order to connect one or more surfaces or regions, for example, at the distal ends 322 and 324. In one embodiment, the location of this connection would be in the thinned region 337 below the platform 112.

Figure 38D:
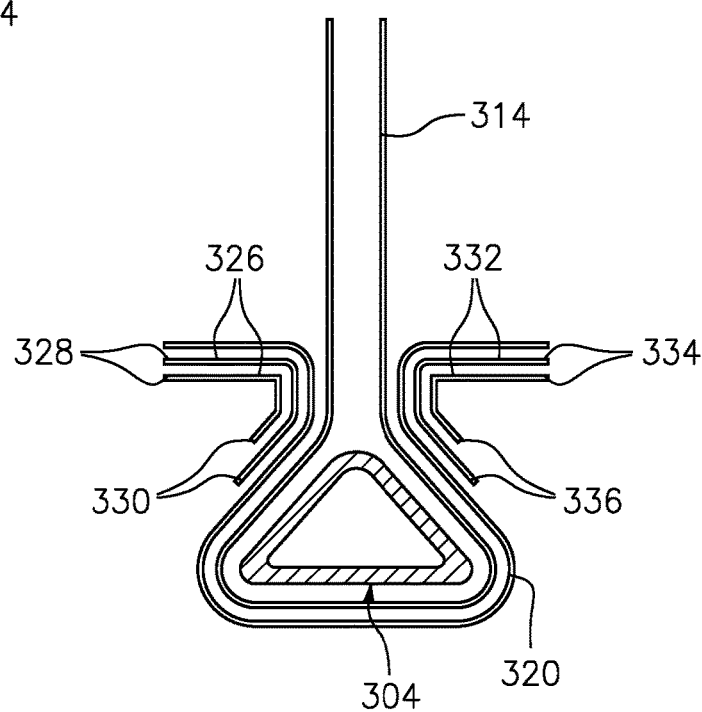

In step 3708, one or more third sheets of material 326 are layered over the second sheet(s) of material 320 to form another (e.g., lateral side) portion of the rotor blade mount 108 (e.g., 112, 114 and/or 116); e.g., see FIG. 39. The third sheets of material 326 may be configured from one or more layers of woven material, or one or one or more layers of braided material. Exemplary embodiments of the third sheets of material 326 are illustrated in FIG. 38D. Each third sheet of material 326 of FIG. 38D extends longitudinally along a length thereof between opposing distal ends 328 and 330, where the distal ends 328 and 330 are arranged on a common side of the attachment preform 304. The first distal end 328 of FIG. 39, for example, is configured to be aligned with (or proximate to) the platform lateral side 130 and/or the overhang 134. The second distal end 330 is configured to be aligned with (e.g., overlap), or be adjacent to, the attachment pressure surface 154. The third sheet(s) of material 326 may thereby provide a reinforced interface between the mount attachment 116, the mount neck 114 and the mount platform 112 and its overhang 134. After wrapping around the second sheet of material 320, in one alternate embodiment, the third sheet of material 326 may be stitched or sewn or connected via other techniques with similar or complementary fibers in order to connect one or more surfaces or regions, for example, at the distal ends 328 and 330. In one embodiment, the location of this connection would be in the thinned region 337 below the platform 112.

In step 3710, one or more fourth sheets of material 332 are layered over the second sheet(s) of material 320 to form another (e.g., lateral side) portion of the rotor blade mount 108 (e.g., 112, 114 and/or 116); e.g., see FIG. 39. The fourth sheets of material 332 may be configured from one or more layers of woven material, or one or one or more layers of braided material. Exemplary embodiments of the fourth sheets of material 332 are illustrated in FIG. 38D. Each fourth sheet of material 332 of FIG. 38D extends longitudinally along a length thereof between opposing distal ends 334 and 336, where the distal ends 334 and 336 are arranged on a common side of the attachment preform 304 that is opposite the side of the third sheet(s) of material 326. The first distal end 334 of FIG. 39, for example, is configured to be aligned with (or proximate to) the platform lateral side 132 and/or the overhang 136. The second distal end 336 is configured to be aligned with (e.g., overlap), or be adjacent to, the attachment pressure surface 156. The fourth sheet(s) of material 332 may thereby provide a reinforced interface between the mount attachment 116, the mount neck 114 and the mount platform 112 and its overhang 136. After wrapping around the third sheet of material 326, in one alternate embodiment, the fourth sheet of material 332 may be stitched or sewn or connected via other techniques with similar or complementary fibers in order to connect one or more surfaces or regions, for example, at the distal ends 334 and 336. In one embodiment the location of this connection would be in the thinned region 337 below the platform 112.

In step 3712, the various materials 306, 308, 314, 320, 326 and 332 are bonded together to form a monolithic rotor blade body. For example, where each of the various materials 306, 308, 314, 320, 326 and 332 are pre-impregnated/disposed within with a matrix, the matrix may be cured. Alternatively, the various materials 306, 308, 314, 320, 326 and 332 or some of those materials may be impregnated with/disposed within the matrix and then cured.

The method 3700 may include additional step other than those described above. The method 3700, for example, may include one or more surface machining steps and/or one or more coating steps in order to provide the final rotor blade 104.

The foregoing materials 306, 308, 314, 320, 326, 332 and any fibers used for stitching, sewing, etc. may be selected to be a common material; e.g., have the same material makeup. Alternatively, one or more of the foregoing materials 306, 308, 314, 320, 326, 332 and any fibers used for stitching, sewing, etc. may be different than one or more of the other materials 306, 308, 314, 320, 326 and 332.

Each of the foregoing materials 306, 308, 314, 320, 326 and 332 may be configured as a woven or braded material. Some or all of the stands of the material, for example, may be woven and/or braided together to form the sheet(s) of material. Of course, in other embodiments, one or more of the layers of material may include chopped fibers as filler and/or reinforcement.

One or more or each of the foregoing materials 306, 308, 314, 320, 326 and 332 may be ceramic, which may be a monolithic ceramic, woven or braided material with one or more fiber types, or a ceramic matrix composite (CMC) material. An example of the monolithic ceramic is, but is not limited to, $Si_3N_4$. Examples of the ceramic matrix composite material include, but are not limited to, SiC/SiC and C/SiC. The present disclosure, however, is not limited to the foregoing exemplary materials compositions. The present disclosure is also not limited to ceramic rotor blades. For example, as described above, the rotor blades 104 may alternatively be formed from metal or intermetallic material. In another example, the rotor blades 104 may alternatively be formed from a combination of ceramic and metal. Each attachment preform 304 or a portion thereof (e.g., 306 or 308), for example, may be configured from or otherwise include metal while the rest of the respective rotor blade 104 may be configured from or otherwise include one or more of the above-described ceramic materials, or another material different from the metal of the attachment preform 304 for example. In alternate embodiments, the rotor blades 104 may contain one or more passages for cooling; e.g., passage(s) 236 as shown, for example, in FIG. 30.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:
1. A rotor assembly for a gas turbine engine, comprising:
a first rotor disk configured to rotate about a rotational axis;
a second rotor disk configured to rotate about the rotational axis;
a plurality of rotor blades arranged circumferentially around the rotational axis, each of the plurality of rotor blades axially between and mounted to the first rotor disk and the second rotor disk; and
a plurality of vanes arranged circumferentially around the rotational axis, the plurality of vanes comprising a first vane and a second vane circumferentially neighboring the first vane, the first vane integral with the first rotor disk and projecting axially to the second rotor disk, and the second vane integral with the second rotor disk and projecting axially to the first rotor disk.
2. The rotor assembly of claim 1, wherein
the first vane extends longitudinally along a centerline from a radial inner end of the first vane to a radial outer end of the first vane; and
at least a portion of the centerline is straight.
3. The rotor assembly of claim 1, wherein
the first vane extends longitudinally along a centerline from a radial inner end of the first vane to a radial outer end of the first vane; and
at least a portion of the centerline is curved.
4. The rotor assembly of claim 1, wherein
the first vane extends longitudinally along a centerline from a radial inner end of the first vane to a radial outer end of the first vane; and at least a portion of the centerline is perpendicular to the rotational axis.

5. The rotor assembly of claim 1, wherein
the first vane extends longitudinally along a centerline from a radial inner end of the first vane to a radial outer end of the first vane; and
at least a portion of the centerline is angularly offset from the rotational axis.

6. A rotor assembly for a gas turbine engine, comprising:
a first rotor disk configured to rotate about a rotational axis;
a second rotor disk configured to rotate about the rotational axis;
a plurality of rotor blades arranged circumferentially around the rotational axis, each of the plurality of rotor blades axially between and mounted to the first rotor disk and the second rotor disk; and
a plurality of vanes arranged circumferentially around the rotational axis, the plurality of vanes comprising a first vane and a second vane circumferentially neighboring the first vane, the first vane integral with the first rotor disk and projecting axially to the second rotor disk, and the second vane integral with the first rotor disk and projecting axially to the second rotor disk.

7. The rotor assembly of claim 1, wherein the plurality of vanes are configured to pump fluid in a radial outward direction in a passage, axially between the first rotor disk and the second rotor disk, towards the plurality of rotor blades.

8. The rotor assembly of claim 1, wherein a passage defined circumferentially between a circumferentially neighboring pair of the plurality of vanes is fluidly coupled with a passage within a first of the plurality of rotor blades.

9. The rotor assembly of claim 1, wherein
the first rotor disk includes a hub, a web and a rim;
the web extends radially out from the hub to the rim; and
the first vane projects axially out from and is integral with the web.

10. The rotor assembly of claim 1, further comprising a plurality of disk mounts connecting the first rotor disk and the second rotor disk together.

11. The rotor assembly of claim 10, wherein a first of the plurality of disk mounts is disposed circumferentially between a circumferentially neighboring pair of the plurality of vanes.

12. The rotor assembly of claim 1, wherein the plurality of rotor blades comprise a first rotor blade with a dovetail attachment.

13. The rotor assembly of claim 12, wherein the dovetail attachment projects axially along the rotational axis into a first pocket in the first rotor disk.

14. The rotor assembly of claim 13, wherein the dovetail attachment projects axially along the rotational axis into a second pocket in the second rotor disk.

15. The rotor assembly of claim 12, wherein a portion of the first rotor disk extends circumferentially across and thereby circumferentially covers the dovetail attachment.

16. The rotor assembly of claim 1, wherein the plurality of rotor blades comprise a first rotor blade, and the first rotor blade comprises ceramic.

17. The rotor assembly of claim 6, wherein
the first vane extends longitudinally along a centerline from a radial inner end of the first vane to a radial outer end of the first vane; and
an entirety of the centerline is non-straight.

\* \* \* \* \*